Sept. 28, 1943.    W. W. MAHER    2,330,229
CAN END TESTING MACHINE
Filed Oct. 15, 1941    12 Sheets-Sheet 1

INVENTOR.
William W. Maher
BY Ivan D. Thornburgh
Charles H. Erne
ATTORNEYS

Sept. 28, 1943. W. W. MAHER 2,330,229
CAN END TESTING MACHINE
Filed Oct. 15, 1941 12 Sheets-Sheet 2
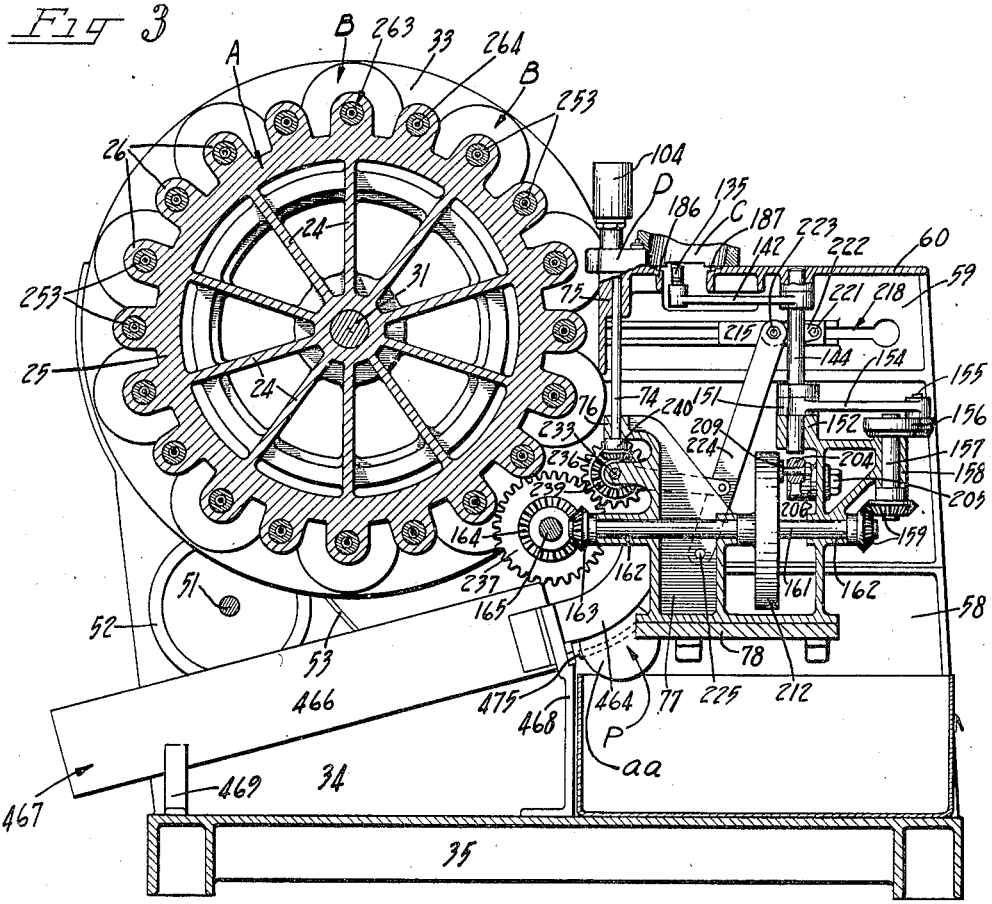
Fig 3
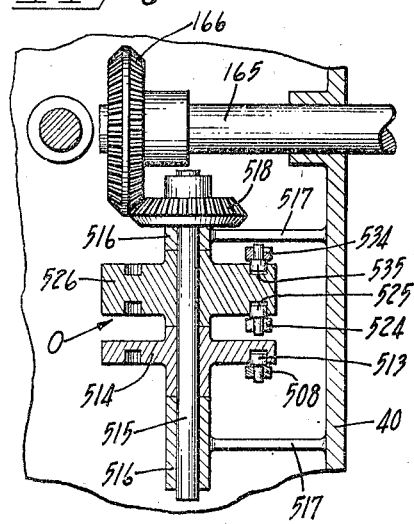
Fig 6
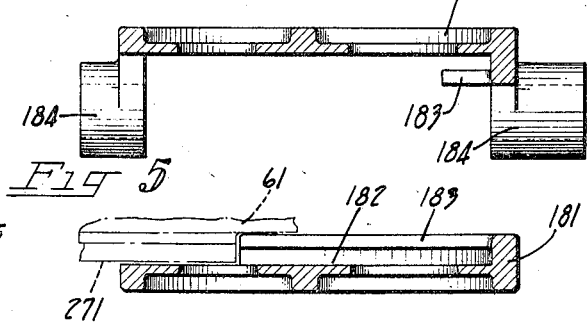
Fig 4
Fig 5
INVENTOR
William W. Maher
BY Ivan D. Thornburgh
Charles H. Erne
ATTORNEYS

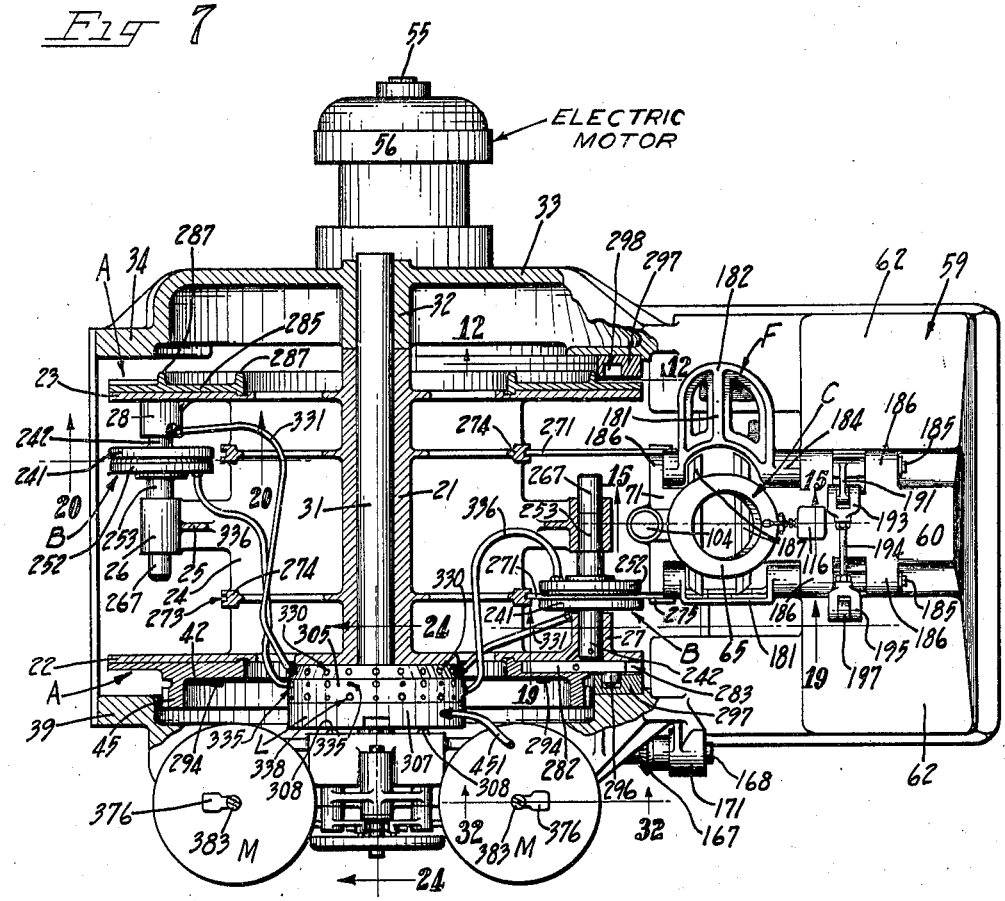
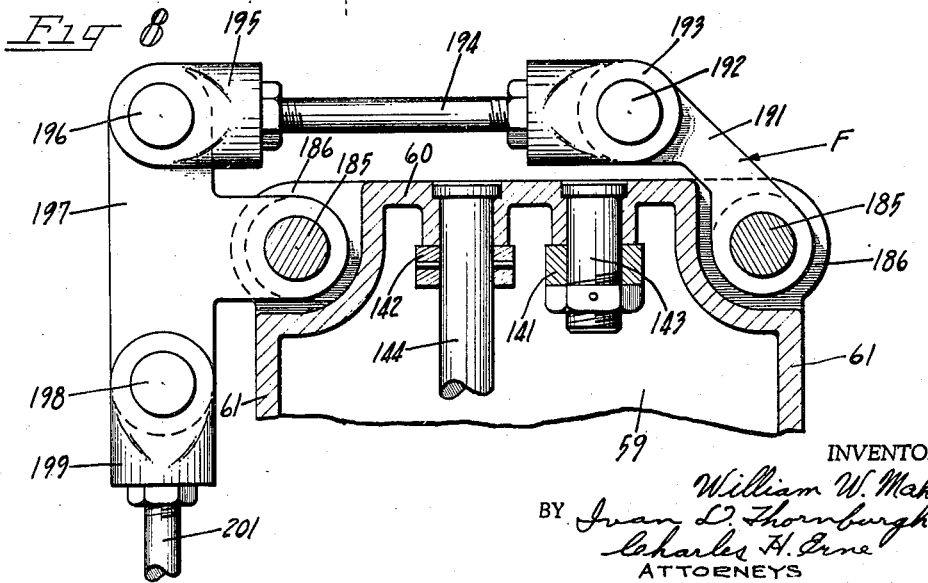

Sept. 28, 1943.  W. W. MAHER  2,330,229
CAN END TESTING MACHINE
Filed Oct. 15, 1941  12 Sheets-Sheet 4
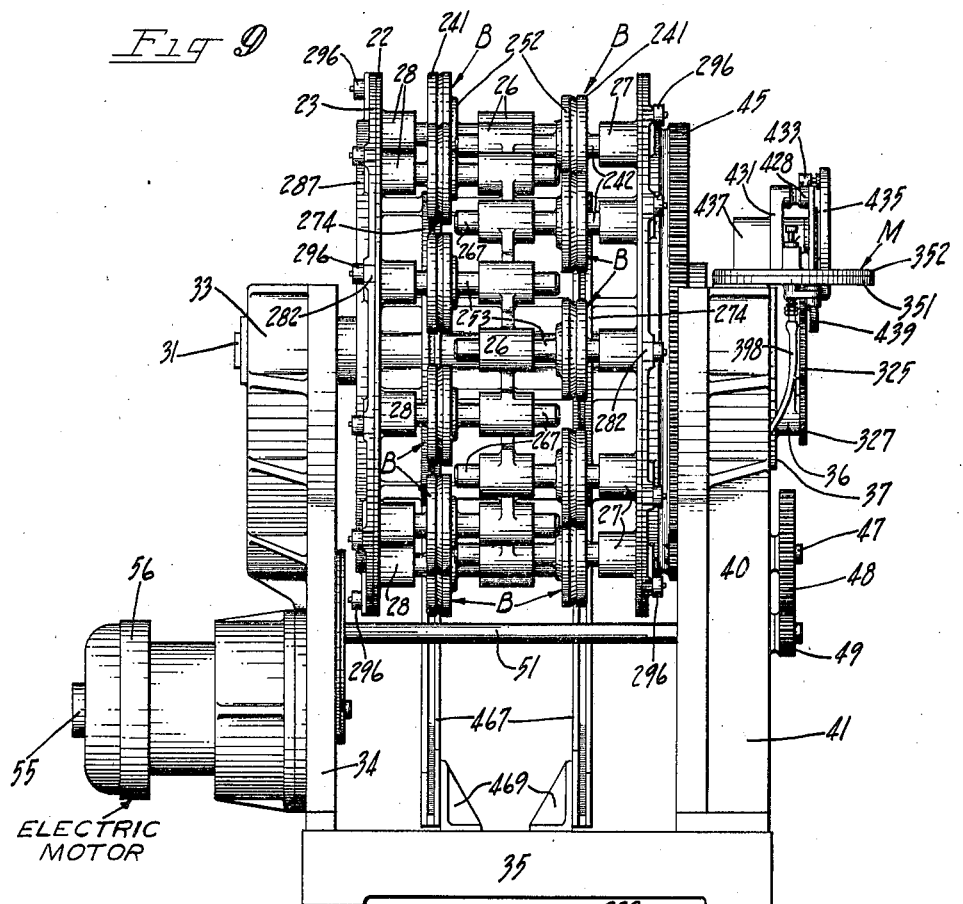
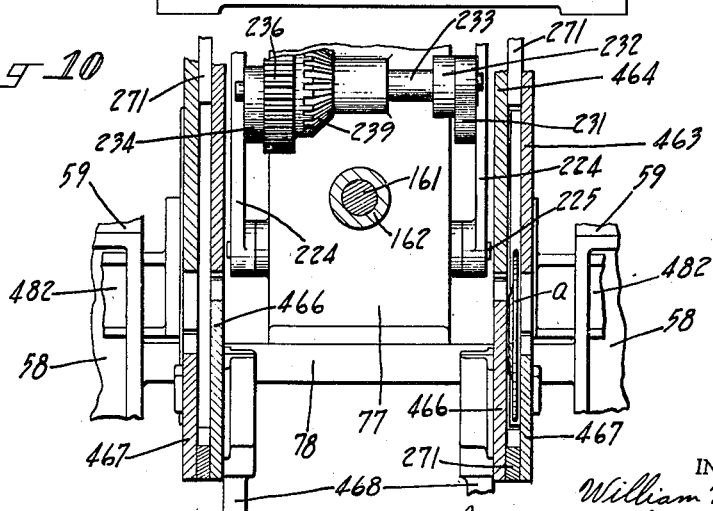
INVENTOR.
William W. Maher
BY Ivan D. Thornburgh
Charles H. Enne
ATTORNEYS

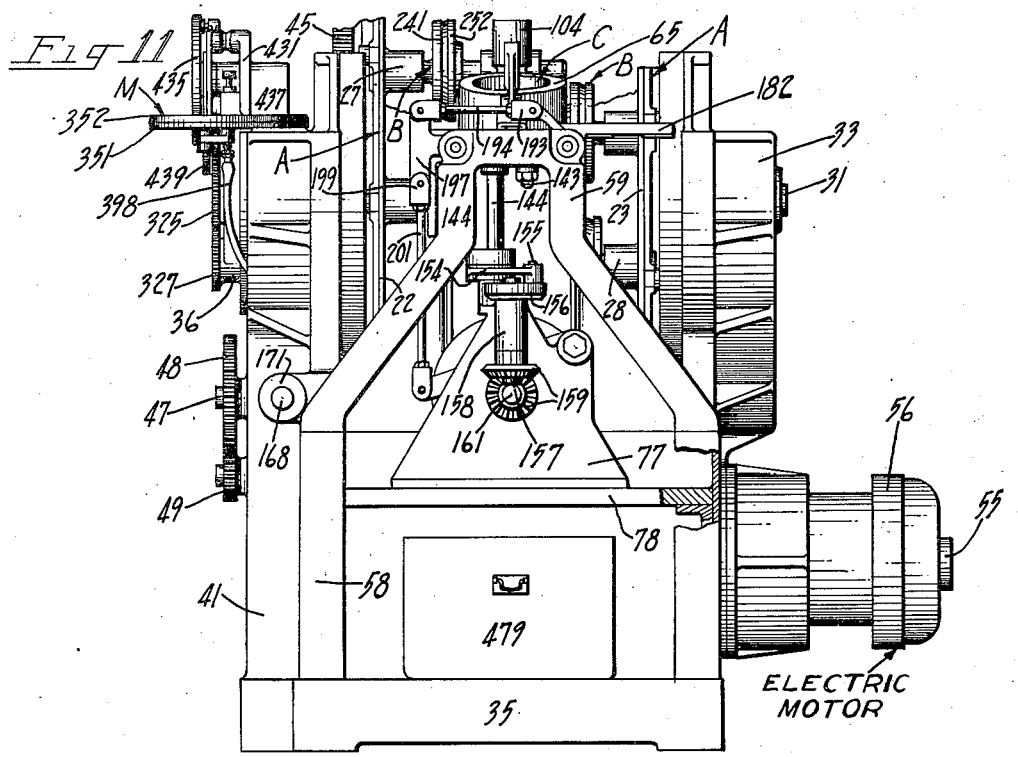

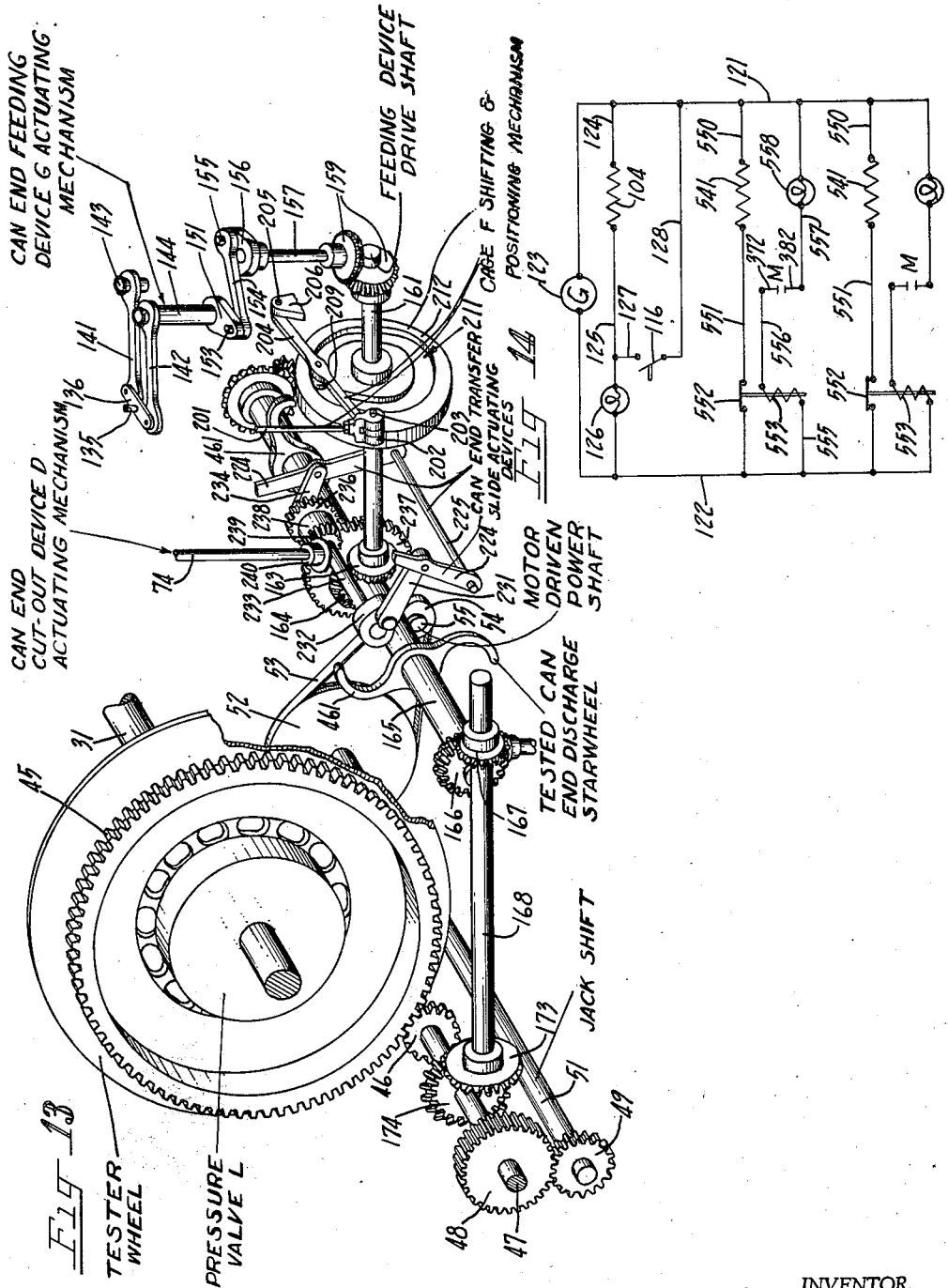

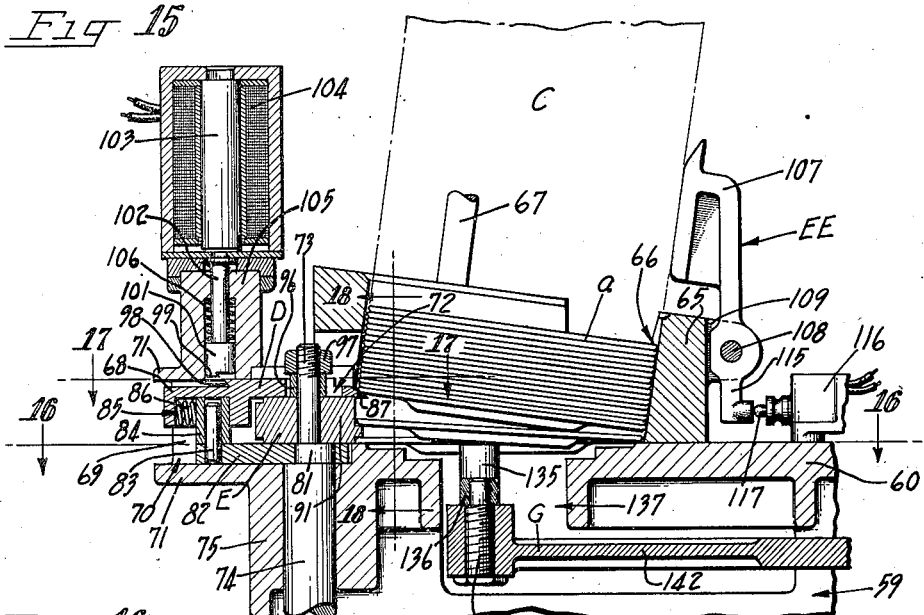

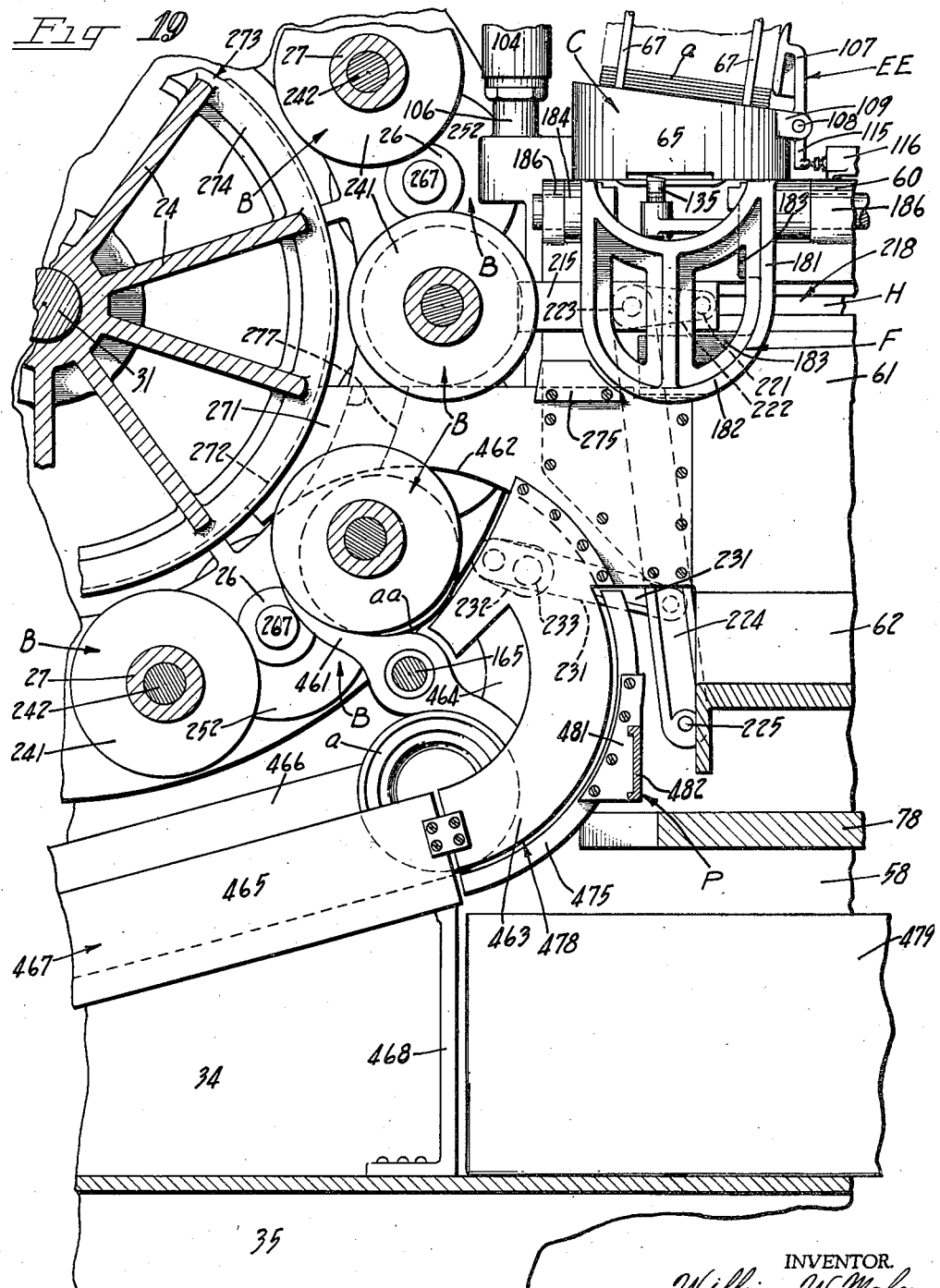

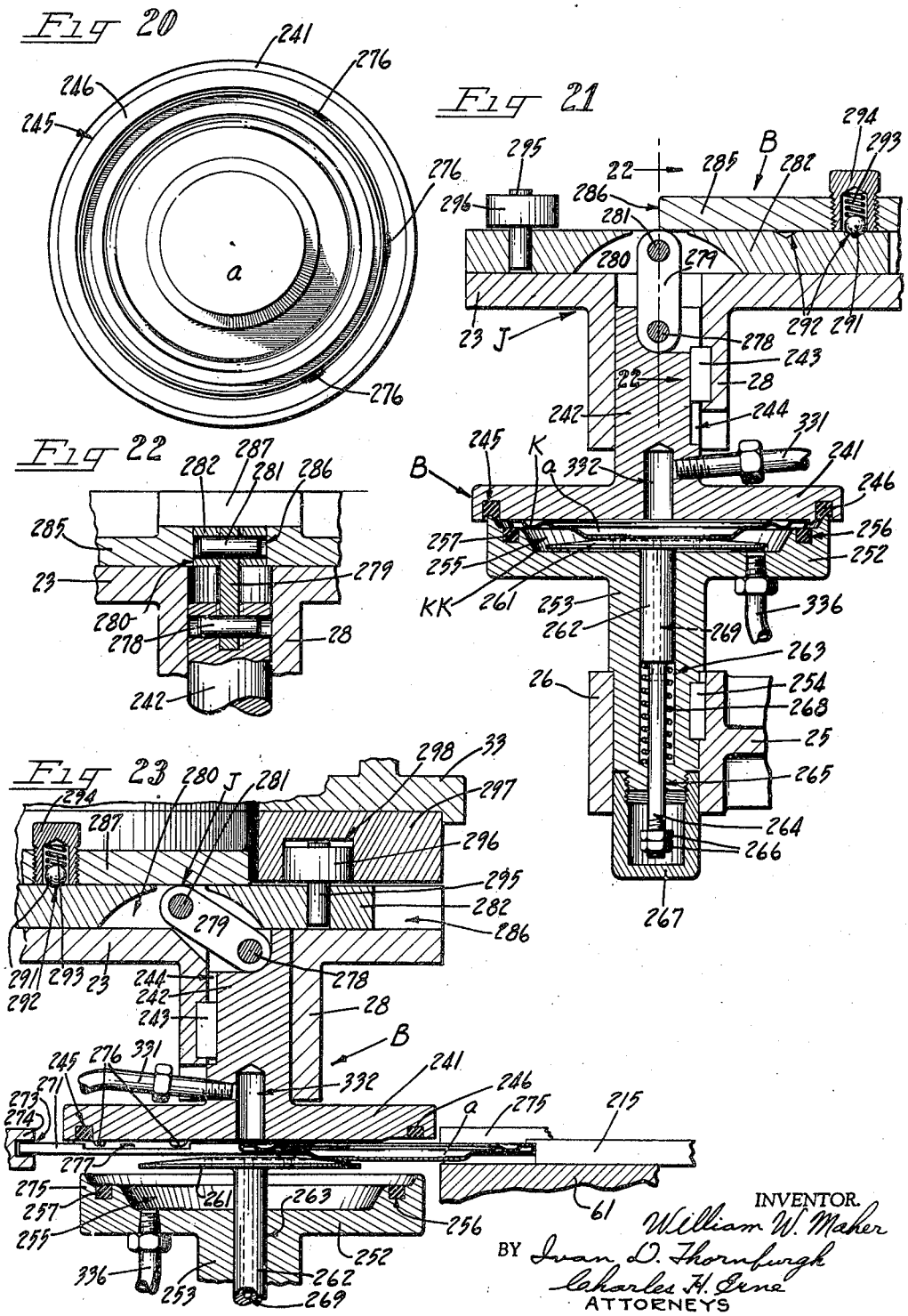

Sept. 28, 1943.　　　　W. W. MAHER　　　　2,330,229
CAN END TESTING MACHINE
Filed Oct. 15, 1941　　　12 Sheets-Sheet 10
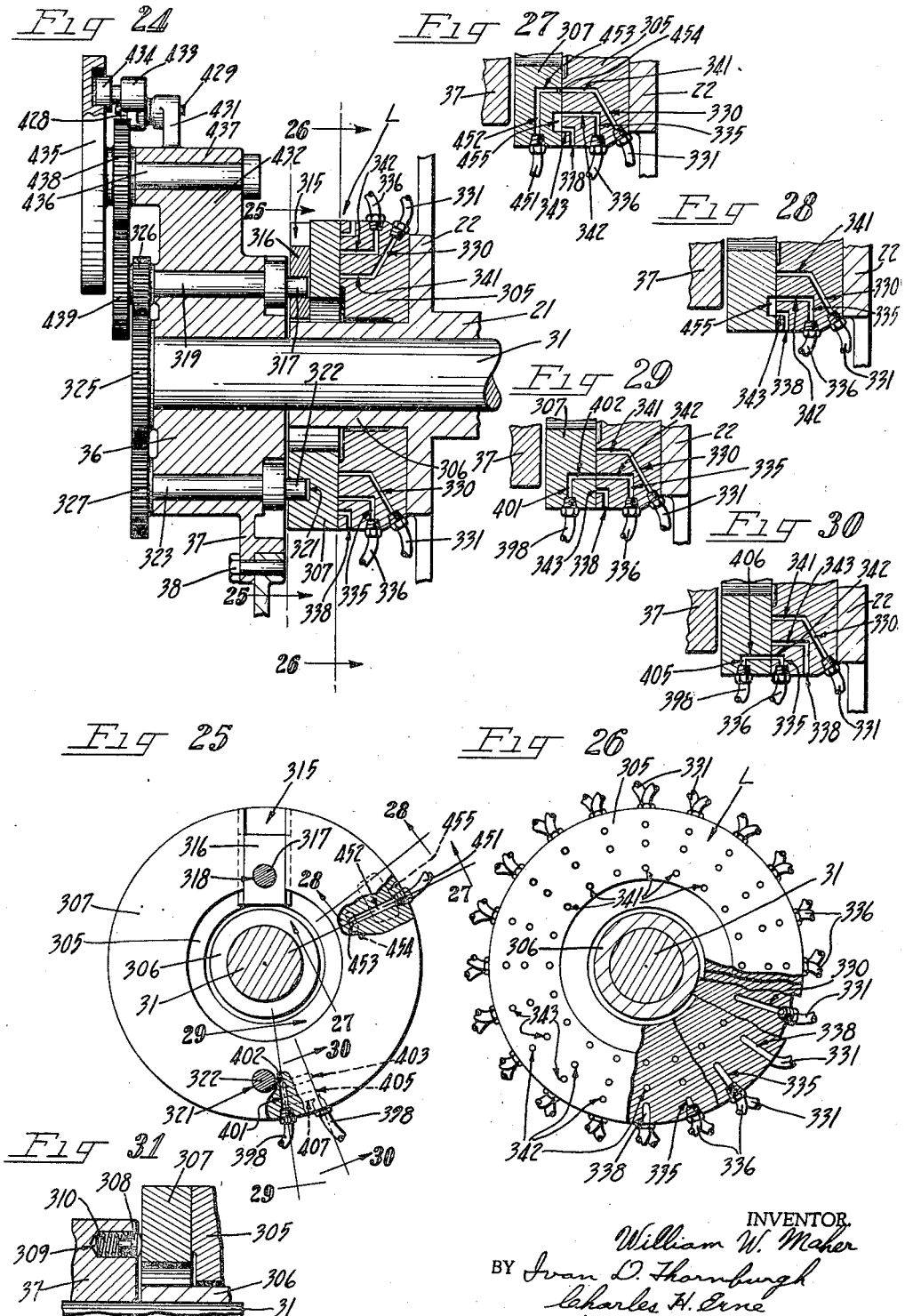

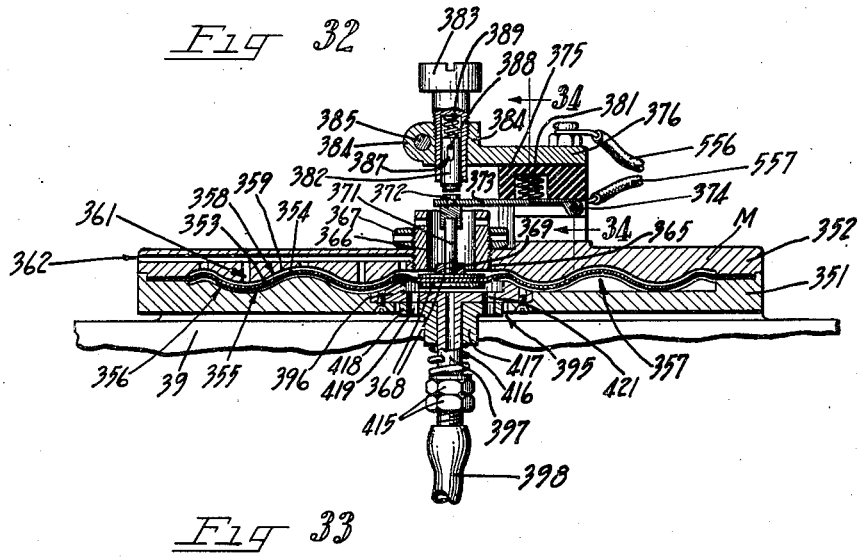
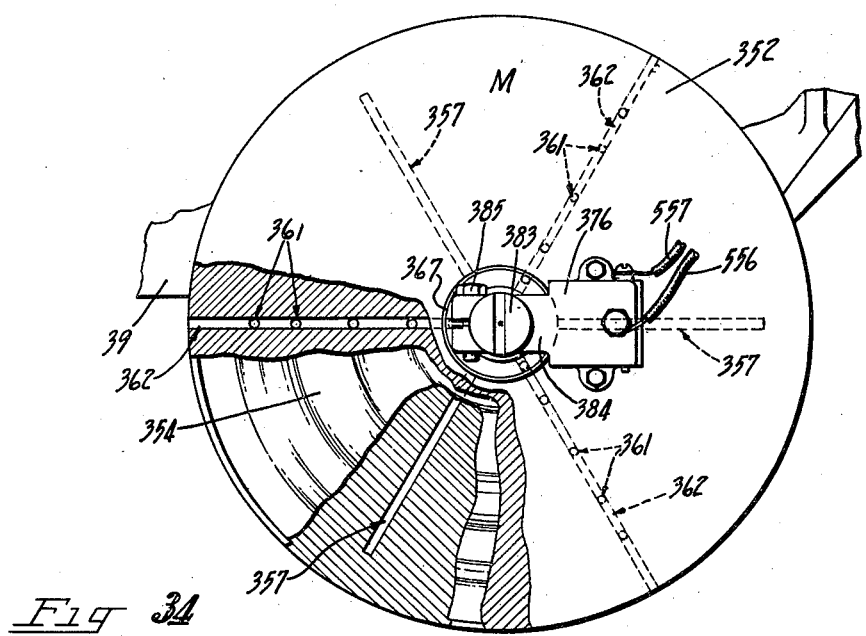
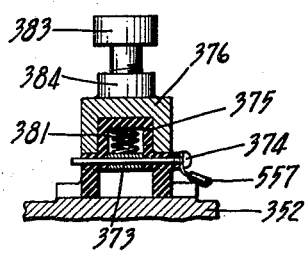

Sept. 28, 1943.     W. W. MAHER     2,330,229
CAN END TESTING MACHINE
Filed Oct. 15, 1941     12 Sheets-Sheet 12
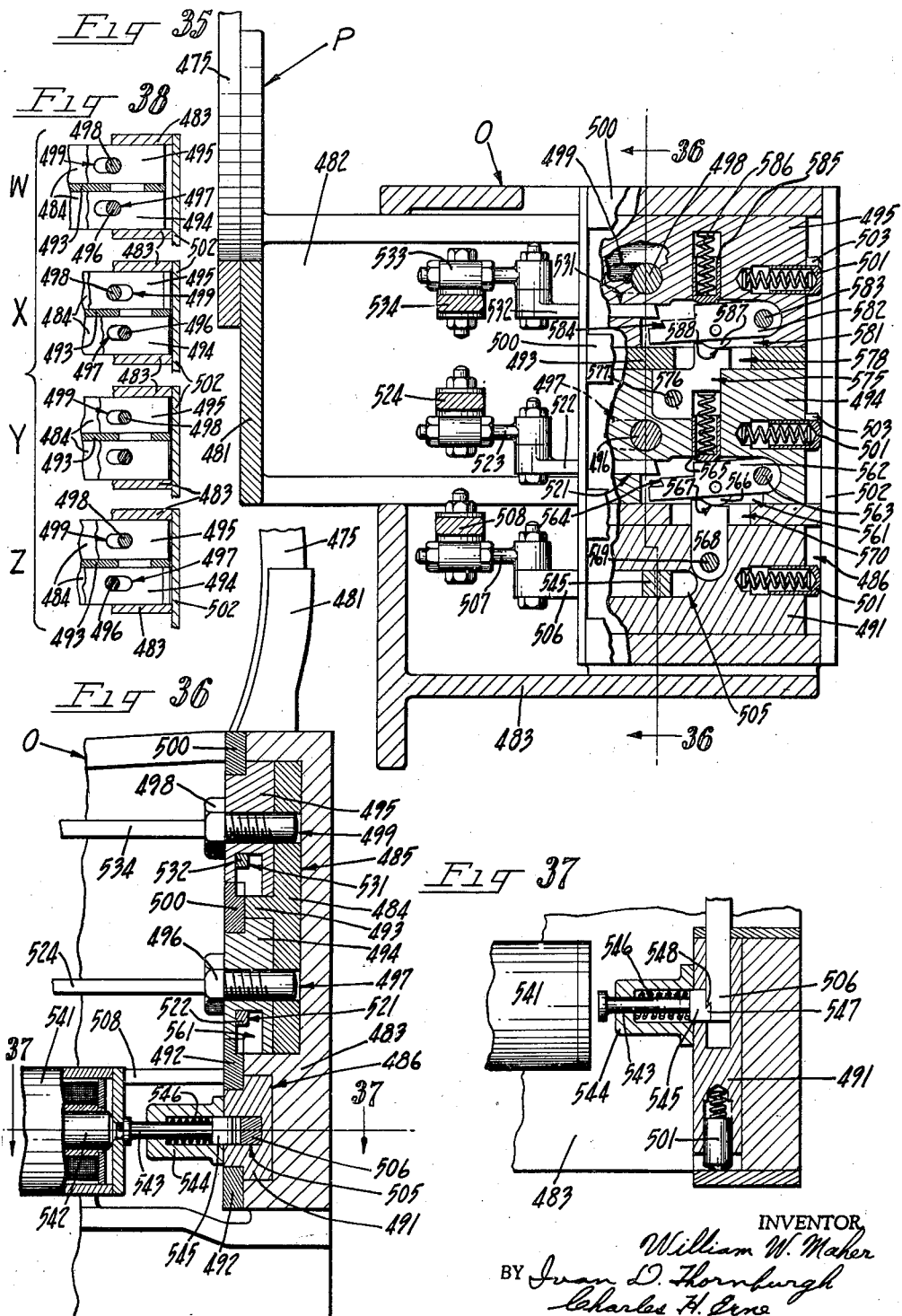

Patented Sept. 28, 1943

2,330,229

UNITED STATES PATENT OFFICE 2,330,229

CAN END TESTING MACHINE

William W. Maher, San Francisco, Calif., assignor to American Can Company, New York, N. Y., a corporation of New Jersey Application October 15, 1941, Serial No. 415,129

15 Claims. (Cl. 73—51)

The present invention relates to an air pressure can end testing apparatus for detecting perforations or other imperfections in the end wall and has particular reference to an improved feeding mechanism for the can ends and to more efficient tester heads so that rapid testing is obtained without in any way detracting from the accuracy of the testing operation.

An object of the invention is the provision of a can end testing apparatus wherein can ends are fed individually from a stack of ends and are positioned in a tester head at high speed and wherein the ends are tested by air pressures applied to opposite sides so that the ends having imperfections causing leaks are segregated from the perfect ends.

Another object of the invention is the provision of a two-wheel can end tester having high speed feeding devices for feeding can ends from a single source and for depositing the ends alternately into the two wheels so that high testing efficiency is obtained uniformly in both wheels.

Another object is the provision of a can end tester of the character described having tester heads which are carried on a pair of vertically disposed testing wheels which are continuously rotated, can ends being fed from a single mechanism alternately into the tester heads, one end to a head on one wheel and the next end to a head carried on the other wheel, the relative position of the heads on the two wheels being such as to insure a high speed feeding action with the resulting substantially continuous testing of successive can ends.

Yet another object of the invention is the provision of an improved tester head for a can end testing apparatus which embodies fixed and movable members for clamping a can end therebetween and in position for testing of the can end so that the opposite sides of the can end form parts of individually sealed chambers which may be subjected to predetermined air pressures for effecting the test.

Another object is the provision of a can end testing apparatus for the purpose described which includes a delay mechanism set in motion upon completion of the testing operation for actuating a throw-out device when a tested leaky can end has been brought into a discharge position, the device removing such an end from the regular path of travel of the non-leaky tested can ends leaving the apparatus.

Numerous other objects and advantages of the invention will be apparent as it is better understood from the following description, which, taken in connection with the accompanying drawings, discloses a preferred embodiment thereof.

Referring to the drawings:

Fig. 3 is a longitudinal sectional view through the apparatus and looking in the same direction as in Fig. 1;

Figure 1:
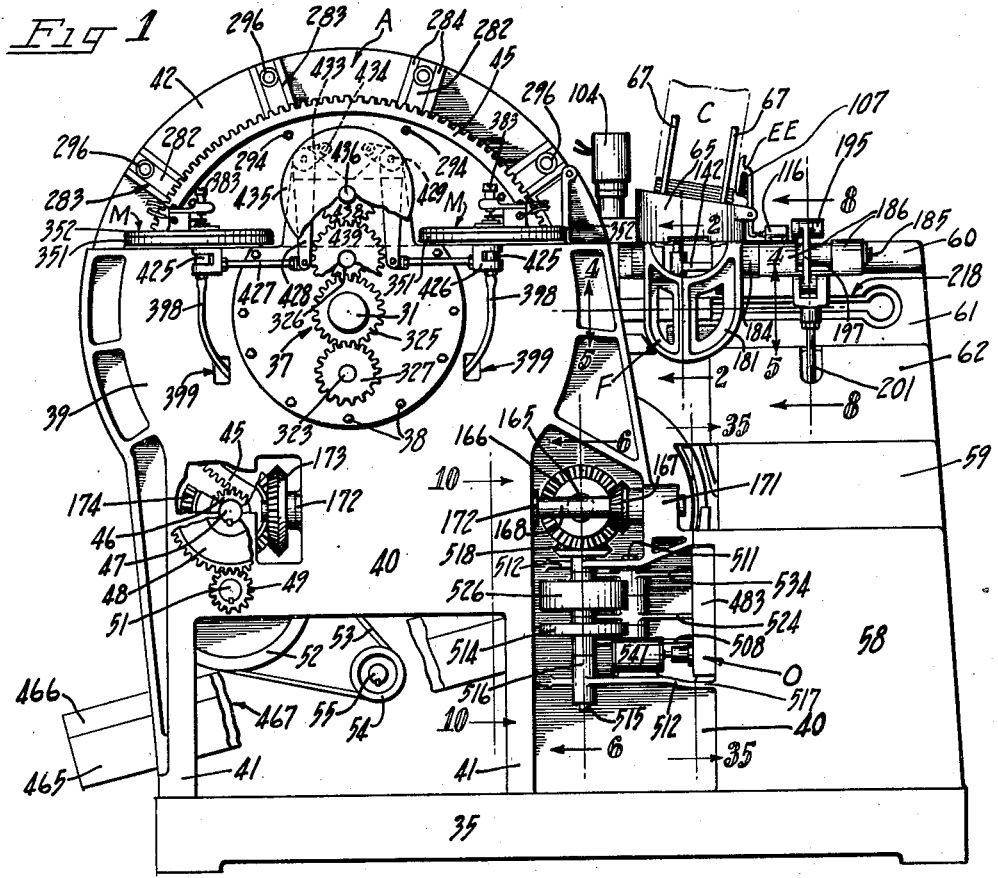
Figure 1 is a front elevation of a can end testing apparatus embodying the present invention.

Figs. 4 and 5 are reverse sectional details both being taken along the line illustrated in Fig. 1 which is marked with arrows and the numerals 4—4 and 5—5, Fig. 4 being an under side view and Fig. 5 being a top sectional view;

Fig. 6 is an enlarged sectional detail of a portion of the driving mechanism, as viewed along the section line 6—6 in Fig. 1;

Fig. 7 is a composite sectional and top plan view illustrating the tester wheels in section and the can end magazine and associated mechanism in plan view;

Fig. 8 is an enlarged sectional detail taken substantially along the line 8—8 in Fig. 1;

Fig. 9 is an end elevation of the apparatus as viewed from the left in Fig. 1;

Fig. 10 is a sectional detail on an enlarged scale of a part of the discharge mechanism as viewed substantially along the section line 10—10 in Fig. 1;

Fig. 11 is an end elevation as viewed from the right in Fig. 1;

Fig. 12 is a face view of one of the cam details as it would appear from a viewpoint indicated by the broken section line 12—12 in Fig. 7;

Fig. 13 is a schematic view shown in perspective and embodying the principal driving or operating shafts and gears relating to actuating parts of the apparatus;

Fig. 14 is a wiring diagram of the electric circuits used in the apparatus;

Fig. 15 is an enlarged sectional view taken longitudinally of the can end magazine as viewed along the section line 15—15 in Fig. 7;

Fig. 16 is a plan sectional view of certain can end feeding devices located below the magazine as viewed along the section line 16—16 in Fig. 15;

Fig. 17 is a sectional detail taken substantially along the line 17—17 in Fig. 15;

Fig. 18 is a face view of a portion of the can end cut-out device as viewed from the line 18—18 in Fig. 15;

Fig. 19 is an enlarged sectional view taken along the line 19—19 in Fig. 7 with parts broken away;

Fig. 20 is an enlarged face view of one of the tester heads as viewed along the line 20—20 in Fig. 7;

Fig. 21 is an enlarged plan sectional view taken through one of the tester heads and illustrating a can end in clamped position;

Fig. 22 is a sectional detail as viewed along the section line 22—22 in Fig. 21;

Fig. 23 is a view similar to Fig. 21 but viewing the head after it has passed to the opposite side of the tester wheel and illustrating a can end entering into the tester head, the parts of which are shown in unclamped position;

Fig. 24 is an enlarged sectional view taken through a unit air valve which is connected with the testing heads and is a view taken substantially along the line 24—24 in Fig. 7;

Figs. 25 and 26 are sectional views of portions of the air valve partially broken away and taken along the respective lines 25—25 and 26—26 in Fig. 24;

Figs. 27, 28, 29 and 30 are fragmentary sectional views of the air valve shown in Fig. 24 and illustrating different positions of the valve, these views being sections taken along the lines 27—27, 28—28, 29—29 and 30—30 in Fig. 25;

Fig. 31 is a fragmentary sectional view illustrating another part of the valve mechanism;

Fig. 32 is an enlarged sectional view of an air diaphragm unit as taken substantially along the line 32—32 in Fig. 7;

Fig. 33 is a plan view with parts broken away of the unit illustrated in Fig. 32;

Fig. 34 is a sectional detail partially in elevation as viewed substantially along the broken line 34—34 in Fig. 32;

Fig. 35 is a sectional view of the discharge delay mechanism as viewed substantially along the line 35—35 in Fig. 1, parts being broken back;

Fig. 36 is a sectional view taken substantially along the line 36—36 in Fig. 35;

Fig. 37 is a sectional detail taken substantially along the line 37—37 in Fig. 36 showing certain parts in different position; and Fig. 38 is a schematic diagram of four different positions of certain slide parts of the delay mechanism shown in Fig. 35.

The machine illustrated to exemplify the present invention comprises a double wheel structure, indicated by the letter A, each wheel of which carries a series of spaced tester heads B, the wheels being located one in front, the other in the rear of the apparatus. The position of the tester heads on one wheel is such as to be in staggered relation to those on the other wheel so that as the wheel structure turns, a head of one wheel passes a given horizontal line to be followed immediately by a tester head on the other wheel passing such a line. This makes it possible to feed can ends to both wheels from the same horizontal position.

A unit magazine C is located intermediate the two wheels and is adapted to hold in stack formation can ends $a$ to be tested. The stack of ends held within the magazine C is inclined slightly from the vertical so that one side of the stack is lower than the other.

A cut-out or segregating device, generally indicated by the letter D, is provided for supporting the high side of the stack when the device is in non-operated position. Segregating device D extends along the magazine center and is located at the inner side of the magazine which is the high side of the stack.

During normal operation of the machine the cut-out device D operates in synchronism with the rotation of the tester wheel A so that the lowermost can end $a$ in the stack is separated from the can end just above each time a tester head B passes a given point. Such separation permits lowering of the high side of the lowermost can end so that this side of the end may be separated further from the stack of ends on that side.

The lowering device which further moves the end after its initial separation may be considered a part of the segregating magazine unit. Such a device constitutes broadly a separating drum or rotating member E arranged on a vertical shaft and located just below a part of the sliding member of the initial segregating device.

Rotating member E is formed with an interrupted helical thread on its cylindrical wall so that when the sliding element of the initial segregating device operates to release the one side of the lowermost can end from the stack of ends in the magazine, the high side of the end so released is engaged by the thread of the rotating member. This lowers the can end $a$ into a horizontal position. The opposite or lower side of the can end while in the stack remains substantially in the same horizontal plane during this moving of the can end into a horizontal position.

A low end stack control EE is provided for stopping operation of the slide segregating device in the event of the stack of ends running low. This is to insure proper feeding action of the ends from the magazine. If too few ends are in the stack there is always the danger of interference in the smooth feeding action normally obtained. This will be described in the proper place.

The magazine C and segregating device D, with the rotating member E, do service for both of the tester wheels A. The transferring of a can end $a$ into its tester head is brought about by several separate operating devices which may be mentioned briefly at this time. Provision is made for shifting a can end to the front or to the back of the machine immediately after it has been brought down into horizontal position. This shifting alternates on successive ends so that when a can end has been moved toward the front the next following can end is moved toward the back. Such an alternating movement takes place without interruption so that a continuous succession of can ends are moved from the bottom of the magazine and are then fed into the tester heads.

A wing or hinge cage device F is provided for receiving a can end when it is moved from the magazine. Such a device is duplicated on the two sides of the magazine and each cage is adapted to receive a can end in a horizontal position and then by a hinging action, the cage swings the can end into a vertical position. The two cage members on the two sides of the machine alternate so that when one cage member is in horizontal position, the other member is in vertical position. This movement is to position the can ends so that each may be fed to its tester head B at the proper time.

An alternating feeding device G is utilized for shifting a segregated can end $a$ into its cage member F. Such an alternating feeding device includes parallelogram arms so that when moved in one direction a can end is pushed into its cage member. The can end engaging part of such a feed mechanism is brought into position by this movement to engage the next separated can end to feed it in the opposite direction.

The feeding of the can end from its vertical position within the cage device is effected by means of a slide tester head feed H. Such a feed consists of duplicate slide members and when one of the slide members is moving forward to transfer a can end from its vertically disposed cage into the tester head B, the other slide member is moving back after having delivered its can end. The latter movement is in preparation of feeding the next following can end into the next succeeding tester head.

In the tester head, a can cover $a$ is brought between fixed and movable head members. As soon as the can end is in proper position, the movable member is pressed into clamping relationship with the fixed member. This pressing action is brought about by a locking device J which not only clamps the can end between the head members but also seals off a space in each head member so that the can end then is interposed between two sealed spaces or testing chambers K and KK.

This feeding of a can end into a tester head and the clamping of the end therein takes place while the tester wheels continue their rotation. Immediately following the clamping of a can end, the sealed spaces K and KK which constitute testing chambers, are connected with suitable air pressures so that a predetermined pressure is provided for each of the chambers. This is done by means of a pressure valve L having the proper parts and passages.

As the tester wheels continue their rotation, a difference in air pressures is provided through the action of the valve, on opposite sides of the can ends, that is, in the testing chambers K and KK. Such a pressure difference is maintained during a considerable part of the movement of a tester head through a single rotation of the tester wheel and this constitutes a holding test period. Following such holding period any change in the pressure difference between the tester chambers K and KK produces certain results. A change in chamber pressures will take place in the event that the can end is imperfect.

For example, a perforation in the can end wall will allow air in the higher pressure testing chamber to pass into the lower chamber as it tends to equalize the pressures. Obviously, this causes a variation in the pressure difference between chambers.

The effect of such an air pressure change by air leakage from one chamber to another is interpreted by the use of a diaphragm unit M associated with the tester head undergoing the test. There is one of these diaphragm units for each of the tester wheels A and such a unit is connected with the particular tester head B through the valve L. An electrical circuit is closed in the unit M when the can end which is being tested has leaked. This electrical circuit is associated with a delay timing unit O which operates to set in motion certain delay mechanism so that when the proper time comes the leaky can end will be segregated from the can ends that do not leak.

For the purpose of segregation, there is provided a can end throw-out device P. The operation of this latter device is brought about by the delay timing unit O and when the leaky can end reaches the throw-out device, this operates. Thus the unit P discharges the leaky can end ejecting it as desired so that it will be diverted from the regular path of travel of good can ends discharged from the machine.

Reference will now be had to the drawings for a more detailed consideration of the various units of the machine just mentioned.

The double tester wheel A is formed with a central hub 21 (Fig. 7) which at the front, merges into a transverse circular front disc 22 and at the rear, in an integral part of a back disc 23 of the same diameter. The discs are joined by a series of radially disposed webs 24 (see also Fig. 3) which extend out as integral parts of the hub 21.

At the longitudinal center of the wheel, i. e., half way between the spaced discs 22, 23 the webs 24 continue outwardly to merge into an annular section 25 (see also Fig. 9) which joins into a series of spaced cylindrical bosses 26. These bosses provide anchorage for the fixed members of the tester heads B for both wheels of the wheel unit A.

The front disc 22 is formed on its inner face with a series of spaced cylindrical bosses 27 which align with alternate bosses 26 at the center of the wheel structure. In like manner the back disc 23 is formed on its inner face with a series of spaced cylindrical bosses 28 which align with the other alternate bosses 26 at the center. Bosses 27, 28 provide anchorage for the movable members of the tester heads B of the respective front and back wheels.

The hub 21 is mounted for rotation with a horizontal shaft 31 (Fig. 7). Shaft 31 is journaled at the rear of the machine in a bearing 32 formed at the center of a cylindrical bowl-shaped housing 33 which is an integral part of a rear frame 34 (see also Fig. 3) which is carried on a base 35.

At the forward end, the shaft 31 is journaled in a bearing 36 (Figs. 1 and 24) formed in a bearing plate 37. This plate 37 is circular and is bolted, as at 38, to a front housing 39 which corresponds in general contour to the rear housing 33. The front housing, however, merges into a flat walled frame 40 which terminates at the bottom in legs 41 which are also carried on the base 35.

The wheel structure A and the shaft 31 are rotated by application of power applied from the outside. Adjacent the front end of the shaft 31, a ring plate 42 (Figs. 1 and 7) is fixed on the front of the wheel disc 22, the outer diameter of plate and disc being the same. The ring plate at the front is formed with a geared section 45, the teeth of which are engaged by a drive pinion 46 (Figs. 1 and 13).

The pinion 46 is mounted upon an intermediate shaft 47 which is suitably journaled in the front housing parts 39, 40 of the machine. Intermediate shaft 47 carries a gear 48 which meshes with a pinion 49 secured to one end of a horizontally disposed jack shaft 51 which extends from front to back just outside of the periphery of the wheel unit A where it is suitably journaled in the front and rear frame parts 34, 40.

The jack shaft 51 at the rear end of the machine carries a grooved sheave pulley 52 over which a V-belt 53 operates. The belt 53 also takes over a sheave pinion 54 which is mounted upon a motor shaft 55 (see also Fig. 7) of an electric motor 56. This motor provides for continuous rotation of the tester wheel unit A and the wheel shaft 31. The motor may be bolted on to the rear face of the rear frame 34 in any suitable manner (see Figs. 9 and 11).

The base 35 on the right of the machine, as viewed in Figs. 1, 3 and 7, provides a foundation for a box frame 58 on which is mounted an arch housing 59 (see also Fig. 11). Housing 59 is formed with a flat top part 60 which is at the upper part of vertical side walls 61 (see also Fig. 2) which extend upwardly from inclined connecting walls 62. The top wall 60 provides a support for the magazine C. The back and front walls of the box frame 58 may be integral sections of the back and front frame 34, 40, respectively.

The magazine C comprises a stack ring 65 (Figs. 7 and 15). The central opening of the ring (indicated by the numeral 66) forms the pocket space for a stack of can ends $a$ to be tested. This opening 66 is inclined slightly from the vertical so that the stack of can ends $a$ while within the magazine is in a slightly inclined position. Magazine rods 67 carried on the ring 65 maintain the stack of can ends in proper alignment.

The stack of ends $a$ within the magazine rests with the lower side of the stack (at the right in Fig. 15) upon the top 60. Opposite this, that is at the high side of the stack, the ends rest upon parts of the segregating device D. This arrangement maintains the inclined position of the can ends within the stack.

The segregating device D includes an upper slide 68 (Figs. 15, 17 and 18) which is disposed adjacent the high side of the magazine C, being confined between side walls 69 of a slot 70 formed in a raised boss 71 at the inner end of the arch housing top 60. Slide 68 is cut through adjacent its inner end with an opening 72 providing clearance for a reduced upper end 73 of a vertically disposed or segregating separator screw shaft 74 (see also Figs. 3 and 13).

Shaft 74, adjacent its upper end, is journaled in a bearing 75 formed in the top section 60 just below the boss 71. At the lower end the shaft 74 is journaled in a bearing 76 formed in a bracket 77. The bracket 77 is mounted on a horizontal web 78 which extends between and which is fastened to the side walls of the box frame 58 thus being located inside of the box frame and inside of the arch housing 59. This bracket carries many of the working parts of the segregating device D and of the alternating feed G. A description of the manner of rotating the shaft 74 will be delayed as it is closely associated with the tester head feed H to be described hereinafter.

Above the bearing 75 and just below its top end 73, the shaft 74 is formed with an eccentric 81 (Figs. 15 and 16) which fits loosely for rotation in the forward perforated end of a lower slide link 82 of the segregating device D. This slide link 82 is mounted in a slot 70 of the boss 71 and as the eccentric 81 turns with the rotation of the shaft 74, the forward perforated end of the slide link 82 moves in a small circle.

This action draws the slide link forward and back with each rotation of the shaft. Slide link 82 carries a pin 83 on which a short sleeve 84 is mounted. The sleeve 84 extends up into a slot 85 cut in the under rear end of the slide member 68. A spring 86 is located in the slot 85 just back of the sleeve and thus is interposed between the sleeve 84 and a rear end wall of the slot. This provides a yielding connection between the two slide parts 68 and 82.

Every time the slide link 82 moves back with each rotation of the shaft 74, the upper slide 68 is correspondingly moved, unless it is held in position by action of the low end detecting unit E as will be described hereinafter. In the event that the slide 68 is prevented from moving, the movement of the slide link 82 is taken up by the spring 86.

The forward end of the slide 68 is thinner than its body section and this end is tapered to form a separator edge 87 (Figs. 15 and 17) which, when the slide moves forward after being pulled back by the slide link 82, engages under and forms a support for the can ends in the magazine at the high side of the stack. This provides what will be designated as the segregating action. When such an action takes place the separated end is in position for actuation by the rotating separator member E.

This separating drum or rotating member E comprises a cylindrical block 91 which is mounted upon and turns with the upper reduced end 73 of the shaft 74. Therefore, it rotates just beneath the forward end of the slide 68. As has been suggested, the block 91 is formed with an interrupted helical thread projection 92 (see also Fig. 18) and when the slide is drawn back, the stack of ends at the high side drops down onto the block. The lowermost end at such a time rests directly upon the top of the projection 92.

The slide 68 immediately returns, following this lowering of the high side of the stack of ends, and its tapered edge 87 thereupon engages between the lowermost end which is still in the stack and the end next above. This action separates the lowermost can end along the high side of the stack since the slide is above the end. At the same time the slide supports the other ends in the stack along the high side.

Immediately following this separation or segregation of the lowermost can end, the continued rotation of the block 91 moves its supporting projection 92 out from under the separated can end. Thereupon the end drops into a helical groove 93 formed by the space between ends of the helical thread and the end rests upon the inclined upper part of the thread. The rotating block 91 lowers the separated can end along its high side, the while it is moving down through the helical groove.

As the lower part of the thread projection 92 passes out from under the separated can end, the latter drops down into a horizontal position. This separated side of the can end thereafter is held down by the thread moving over it. The separated can end at the opposite side is still in the stack where it still forms a support for the remaining can ends in the magazine.

The opening 72 of the slide 68 is an elongated slot which provides clearance for a spacer sleeve 96 mounted on top of the block 91. This block is held in its position on top of the eccentric section 81 of the shaft by a locknut 97 which is threadedly secured to the top end 73 of the shaft 74 and this clamps the sleeve 96 down onto the block. Free sliding movement back and forth of the slide member 68 over the drum 91 is thus assured when a can end is to be separated from the stack.

The low end stack control EE used to stop feeding of the can ends $a$ from the magazine when the supply of ends runs low will now be considered. The slide 68 is formed along its top surface with a transverse inclined ledge 98 (Figs. 15 and 17). When the slide is in its innermost or stack holding position, its ledge 98 is just forward of a similar ledge 99 formed on a cylindrical foot 101 of a sliding pin 102. This pin is lifted by magnetic attraction imparted to a core 103 of an electro-magnet 104. The magnet is mounted on a hollow cylindrical stem 105 which may be an upwardly extending integral part of the housing boss 71. This stem also provides a bearing for the sliding pin parts 101, 102.

This magnet operated pin 102 is adapted to lock the slide 68 and hold it in its end supporting position (Fig. 15) when the supply of ends in the stack falls below a given point. The lowered, locking position of the ledge 99 on the slide is maintained during the time the magnet is de-energized. At such a time a spring 106 which surrounds the pin 102 and is enclosed within the stem 105 presses down on the foot 101 and holds the parts in locking position. Normally, during the operation of the machine, the magnet is energized and the pin 102 with its head 101 is in the raised position of Fig. 15, this lifting action overcoming the action of the spring 106.

On the opposite side of the stack of ends $a$ in the magazine, a stop finger 107 is positioned. This finger is mounted upon a pivot pin 108 which is carried in lugs 109 which project outwardly from the ring 65 of the magazine. The stop finger 107 is weighted above its pivotal mounting and will tip down into the magazine opening unless held back by a supply of can ends in the stack. Such a finger also extends below the pivot pin 108 as a short arm 115. An electric switch 116 is mounted upon the top 60 of the housing 63 and a sliding part 117 of the switch normally projects out toward the magazine, the switch being open at that time.

Referring momentarily to Fig. 14, the control electric circuits associated with such a switch may include lead lines 121, 122 which connect with a suitable source of power such as a generator 123. The electro-magnet 104 is connected by a wire 124 to the lead wire 121. The opposite side of the magnet is connected by a wire 125 to the lead wire 122 through a resistance lamp 126. As long as the generator 123 is operating current flows through the magnet 104 and keeps the pin 102 in its normally raised position and out of the way of the segregating slide 68.

When the supply of ends $a$ in the magazine runs too low, the stop finger 107 is not held outwardly. The stop finger in moving from its normal position rocks on its pivot pin 108 in a counter-clockwise direction (as viewed in Fig. 15). This counter-clockwise movement of the stop finger presses in on the sliding part 117 of the switch 116 and closes a shunt circuit which de-energizes the magnet 104, see the wiring diagram of Fig. 14.

Switch 116 on one side is connected to the wire 125 by a wire 127 and on the other side is connected by a wire 128 to the lead wire 121. With the switch 116 closed, current flows from the lead wire 121 by way of wire 128, switch 116 and wires 127, 125 to the lead wire 122. This circuit offers less resistance than the core winding of the magnet 104, therefore the magnet is shunted out and deenergized.

As soon as this occurs the sliding pin 102 drops under action of the spring 106 and thereupon the locking shoulder 99 engages the ledge 98 of the slide 68 and holds the slide against any withdrawing movement. As long as the slide 68 is thus held, each movement of the link 82 is taken up by the interposed spring 86, as has already been fully described.

Returning now to a further consideration of the separated can end $a$ now resting in its horizontal position with one side still under the stack of ends in the magazine, such an end is now ready to be engaged and transferred by the alternating feed G.

The alternating feed G comprises an end engaging pin 135 (Figs. 15 and 16) which is mounted centrally of a link 136 located directly below the magazine and operating within a clearance recess 137 formed in the top wall 60 of the housing 59. Link 136 (see also Fig. 13) is pivotally connected at its ends as at 138, to parallel feed arms 141, 142. The arm 141 is pivoted on a pin 143 (see also Fig. 8) carried in the housing wall 60. The other arm 142 is mounted on the upper end of a vertically disposed rock shaft 144 also journaled in the wall 60.

The parallel arms 141, 142 move back and forth so that the can end engaging pin 135 moves first to the front and then to the back of the machine. In moving to one side, the can end $a$ which is resting in its horizontal position below the magazine, is slid laterally across the top 60 into the cage F located on that side of the machine.

The pin 135 is moved back immediately in the opposite direction but by this time, another can end which has been separated from the stack during the first movement, is in position to be engaged by the pin and to be moved in the opposite direction. It is fed into a cage F on the opposite side of the machine. This oscillating movement of the parallel arms 141, 142 will first be considered.

The lower end of the shaft 144 carries an arm 151 and is journaled in a bearing 152 (Figs. 3 and 13) formed in the bracket 77. The outer end of arm 151 is pivotally connected by a pin 153 to a link 154 which in turn is pivotally connected at 155 to a crank arm 156. Arm 156 is mounted on the upper end of a vertical crank shaft 157, which is journaled in a bearing 158 formed in the bracket 77.

The crank shaft 157 is continuously rotated by operative connection with the intermediate shaft 47. Shaft 157 is driven through mitre gears 159 from a horizontal transfer drive shaft 161. The shaft 161 is journaled in bearings 162 formed in the bracket 77.

The opposite end of the shaft 161 carries a pinion 163 which meshes with a gear 164 carried on a horizontal shaft 165. The shaft 165 provides for operation of a number of parts of the apparatus in addition to the actuation of the parallel members 141, 142 now being considered. At the forward end of the shaft 165 (see also Fig. 6) a double face bevel gear 166 is provided. The shaft 165 is suitably journaled in bearings formed in the frame 34 at the rear and in the frame 40 at the front of the machine.

The outer face of the double gear 166 meshes with a pinion 167 (see also Fig. 1) mounted on a transverse shaft 168. Shaft 168 is journaled in a bracket 171 which is an integral part of the box housing 58 and in bearings 172 formed in the front frame part 40. The end of the shaft 168 adjacent one bearing 172, carries a gear 173 which meshes with a gear 174 mounted on the intermediate shaft 47.

The operative connection has now been traced, showing that rotation of the intermediate shaft 47 is transmitted to the rock shaft 144 of the alternating feed G. This shifts the cut-out can end first into one cage F on one side of the machine and then into the other cage on the opposite side. When a can end is moving into a cage member it is in horizontal position. This is the position of the cage member F shown just above the magazine C in the plan view of Fig. 7. A detailed consideration of the cage construction and its actuation will be had in reference to the can end it receives and discharges.

The cage F is of a hinged wing type and comprises a top open frame member 181 (Figs. 1, 2, 4, 5 and 19) which is formed with a circular end part 182 which merges into a lower spaced wall 183 forming a hook. The end of each cage frame opposite to its hooked end merges into two spaced cylindrical lugs 184 one of which is secured to a horizontal rock shaft 185 (see also Fig. 8). There are two of these rock shafts one for each cage member and each shaft is journaled in bearings 186 formed in the top 60 of the arch housing 59. The other lug of each cage member carries a pin which has movement on the other bearing 186.

When a can end $a$ advances fully into a horizontally disposed cage F it passes into the space at the rounded end of the cage between the hook part 183 and the top frame 181. During its movement, it is supported on a pair of spaced grooved tracks 187 (Figs. 3 and 7). These two track sections are integral parts of the arch housing top 60 and extend to both sides of the magazine. The side of the end which is at the low side of the magazine is slipped out from under the stack and the stack thereupon drops down upon the track during this advance of the can end.

Figure 2:
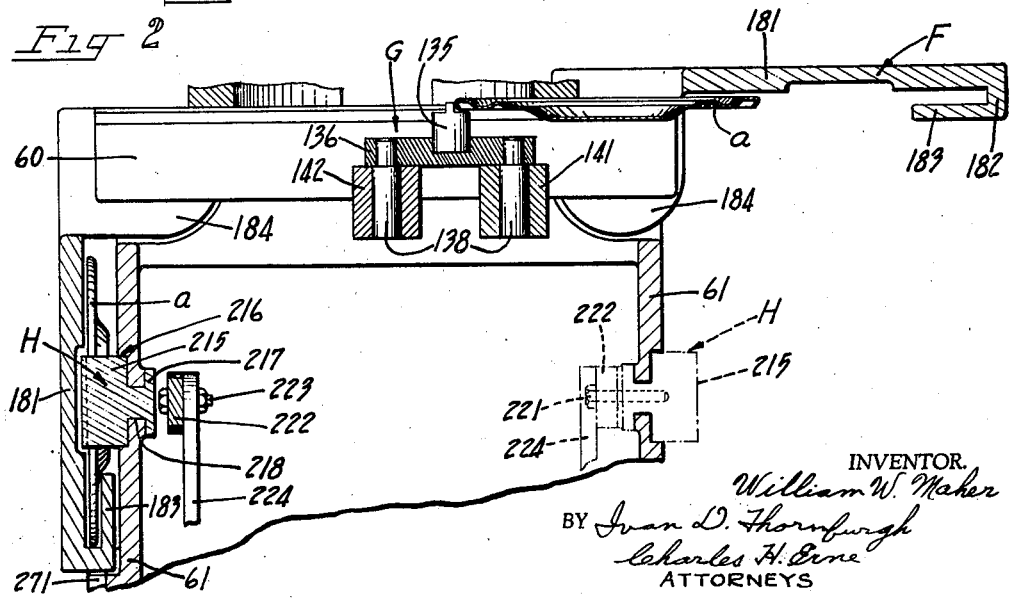
Fig. 2 is an enlarged sectional view of a portion of the apparatus, as viewed along the section line 2—2 in Fig. 1.

When the can end $a$ is fully seated within the cage F the shaft 185 on which that particular cage is mounted, is rocked so that the cage and the can end are brought down into a vertical position. Fig. 2 at the right illustrates a can end $a$ being moved into the right hand cage F which at that time is in horizontal position. This figure also illustrates the left hand cage in its vertical position, the can end $a$ previously fed to the cage on the left hand side of the machine, being shown in position. The two shafts 185 on which the two cage members F are located are rocked in unison, one cage moving down as the other one moves up. This feature will now be considered.

The right hand shaft 185 as viewed in Fig. 8, carries a link 191 (see also Fig. 7) which is pivoted at 192 to a bifurcated block 193 threadedly secured to one end of a tie rod 194. The opposite end of the tie rod is threadedly secured to a bifurcated block 195 which is pivoted at 196 to the upper end of a T-shaped arm 197. The middle leg of the T-arm is secured to the left hand rock shaft (Fig. 8).

This construction ties the two shafts 185 together so that as one shaft is rotated on its axis, the other shaft is correspondingly rotated in the same direction. The rocking of the two shafts is effected by rocking the T-arm 197 and with it its shaft 185. The lower end of the T-arm is pivotally connected at 198 to a bifurcated block 199 secured to the upper end of an actuating rod 201 (see also Fig. 13). The lower end of the rod 201 carries a bifurcated block 202 which is pivotally connected at 203 to the free end of a lever arm 204. The opposite end of the lever arm is pivoted at 205 (Figs. 3 and 13) to a lug 206 which is a part of the bracket frame 77.

The lever arm 204 is rocked up and down under cam action and for this purpose carries a cam roller 209 located adjacent the middle of the lever arm. Cam roller 209 operates in a groove 211 of a face cam 212 which is mounted upon and which is secured to the transfer drive shaft 161.

This oscillation of the lever arm 204 through the connections described, rocks the T-arm 197 and also the shaft 185 to which it is secured and at the same time rocks in unison the opposite shaft 185 through the described connections. When the parts are in the position illustrated in Figs. 2 and 8, the right hand cage member F is in its horizontal or raised position and the opposite cage member is in vertical or lowered position.

Still referring to Fig. 2, after the can end $a$ has been removed from the left hand cage member, the latter then is raised. At the same time the newly received can end $a$ in the right hand cage is moved through 90° in the hinging action of its cage member to bring it into its vertical position. At the time a cage member hinges from vertical into horizontal position, the can end $a$ for that cage has already been removed by the tester head feed mechanism H.

A can end $a$ in its vertical position, is in front of a slide bar 215 (Fig. 2). There is also a corresponding slide bar located on the opposite side of the machine but that bar is in a different position. Each slide bar 215 slides within a groove 216 cut in the side wall 61 of the arch housing 59. The inner face of each slide is formed with a T-shaped head 217. This part of the slide operates in a slot 218 cut through the housing wall. This construction while allowing for easy horizontal sliding movement of the slide member 215, also holds it in sliding position.

Thus it is the forward advance of a slide member 215 that removes the can end $a$ from its cage member F and inserts it into a tester head B which at that time is coming into position to receive it at the forward stroke of the slide. At the same time that a slide 215 is moving forward and is removing the can end from its cage member, the corresponding slide on the opposite side of the machine is moving back in order to be in position to feed the next end after it has been brought down into vertical position by a subsequent hinging action of its cage member F.

The forward and backward movement of each slide member 215 is brought about by its own crank movement from a common shaft. Each slide is pivotally connected at 221 (Figs. 3 and 19) to a link 222 (see also Fig. 2) which is pivotally connected at 223 to the upper end of a feed lever 224. The two feed levers 224 are pivoted on opposite ends of a horizontal pivot rod 225 which is held in the bracket 77.

Provision is made for moving one of the levers 224 forward while the other lever is being moved backward so that the proper feeding action takes place upon the can ends passing into and being positioned by the cage members F. This is shown to best advantage in Figs. 13 and 19. The lever 224 which is on the front of the machine is pivoted just above its mounting to a link 231 which in turn is pivoted to a crank arm 232 secured to one end of a horizontal shaft 233. In like manner the rear lever 224 is pivoted just above its mounting to a link 234 the opposite end being connected to a second crank arm 235 carried on the opposite end of the shaft 233.

The shaft 233 is journaled in bearings formed in the bracket 77 (Fig. 3) and is rotated from the shaft 165. Shaft 233 carries a spur gear 236 which meshes with a gear 237 mounted on the horizontal shaft 165. Continuous rotation of the shaft 165 is thus imparted to the crank shaft 233 which through the action of the cranks 232, 235 moves the two levers 224 in their back and forth travel. The spur gear 236 is an integral part of a sleeve 238 which is formed with bevel teeth 239 which mesh with a bevel gear 240 carried on the lower end of the cut-out separator drum shaft 74. This, it will be recalled, is the actuation for the separator drum E.

The feeding of a can end $a$ into its tester head B by the feed slide 221 is shown in Fig. 23. The construction of a tester head will first be considered so that this feeding movement will be better understood.

Each front disc cylindrical boss 27 (Fig. 7) and each rear disc boss 28 provides a support for a movable head member 241 which is formed with a stem 242. This stem has slight sliding movement within its boss 27 or its boss 28 (Figs. 21 and 23) a feather 243 preventing rotation of the head within its seat, the feather sliding within a featherway 244 cut in the stem. Each movable head 241 is grooved in its outer face as at 245 to form a seat for an annular gasket 246, the outer face of which is flush with the outer face of the head member. The purpose of this will be evident as the description proceeds. This constitutes the principal parts of the movable head part of a testing head B. Attention now will be directed to the fixed head part.

Each cylindrical boss 26 of the annular section 25 of the double wheel structure A provides a support for a fixed head member 252 (Figs. 21 and 23). Each fixed head is formed with a stem 253 which is keyed into fixed position within its boss 26 by a key 254. The movable and fixed head members 241, 252 are on the same axis and are spaced apart, as in Fig. 23, when a tester head approaches the position where it receives a can end $a$.

Each fixed head part 252 is formed with a countersunk space 255 which is on the side of the head facing the movable head part 241. Outside of the countersink the head part 252 is formed with an annular groove 256 in which a ring gasket 257 is seated. The face of this gasket is flush with the adjacent face of the head.

A spring knockout is provided in each fixed part of a tester head. Such a knockout comprises a knockout pad 261 which is formed with a hollow stem 262. The stem 262 is adapted to slide within a central bore 263 which passes through the major length of the stem 253 of the fixed head part. An extension rod 264 is an integral part of the knockout stem 262 and projects out through a reduced diameter opening 265 at the base of the bore 263.

The outer end of the rod 264 is threaded and nuts 266 are secured on the threaded end of the rod to prevent displacement of the knockout device from its tester head. This also provides an adjustment which determines the amount of sliding movement the knockout pad has in the head. A protective sealed cap 267 is threadedly secured on the lower end of the stem 253 and this encloses the end of the rod 264 and its nuts 266. The juncture of the cap 267 and the stem comes within the boss 26 of the tester head.

A spring 268 is located in the end of the bore 263 and is interposed between the end of the knockout stem 262 and the end wall of the bore. This spring provides for the desired knockout action of a can end from the head. It also yieldingly holds the pad 261 in the proper position to guide the can end into the tester head, as it is being slid from its cage F by the tester head feed slide 215. Fig. 23 shows a can end passing into a tester head. The stem 262 may have a central vent bore 269 (Figs. 21 and 23) to relieve air from the passage 263 when the spring 268 is compressed.

As a tester head is coming into position to receive a can end $a$ for the test, the end is leaving its cage and is being moved along a horizontal path by the feed slide 215. Such a path is provided by the top edge of a flat vertically disposed guide plate 271 (Figs. 7 and 19). There are two of these guide plates one for each side of the machine. Each plate at the end adjacent its cage F is secured to the wall 61 of the arch casing on that side. At the other end the guide plate is rounded off as at 272 where it fits into a peripheral groove 273 cut in a ring section 274 which is an integral part of the radial webs 24 of the wheel structure.

First the walls 181, 183 of the cage keep the can end $a$ in vertical position and then the end passes between the open movable and fixed head members 241, 252 as it enters the tester head. A side guide plate 275 is secured on the outside of each guide plate 271 to bridge a small space between cage and tester head. This prevents any displacement of the can end during its passage into the tester head.

As the end enters between the head parts 241, 252 (Fig. 23) it is held over against the movable head by the outwardly positioned knockout pad 261. At the end of the feeding stroke of the feed slide 215 the can end comes to rest against three spaced lugs 276 (see also Fig. 20) formed on the face of the head 241. The end is then centered within the head. As the head is being carried around with the wheel structure the lugs pass through a clearance recess 277 formed in the guide plate 271.

After the can end has been introduced into the separated tester heads the movable head 241 moves against the end forcing it into a clamped and sealed position against the fixed head 252. During such a clamping movement, the spring 268 of the knockout pad 261 yields and allows for controlled seating of the can end.

When the movable head 241 has reached its inward movement (shown in Fig. 21) the can end $a$ is sealed with its terminal curled edge embedded in the annular gasket 257 of the fixed head. At the same time the peripheral rim of the fixed head 252 is embedded in the ring gasket 246 of the movable head. In this sealed position, there is thus a closed space on both sides of the can end.

The sealed space between the face of the movable head 241 and the outer countersunk wall of the can end now provides the testing chamber K. The sealed space occupied by the countersink 255 in the fixed head 252 and closed off by the inner side of the can end now becomes the testing chamber KK. These chambers are thus sealed off from one another and only the wall of the clamped can end is in between the chambers.

The clamping of the movable head 241 upon the seated cover is effected by cam action and this feature will now be considered. The outer end of each movable stem 242 of the movable head is pivotally connected at 278 (Figs. 21, 22 and 23) to a link 279 which extends into a clearance slot 280 and is pivoted at 281 to a radial slide member 282. There is one of these slide members adjacent each tester head.

Since the front wheel disc 22 on which the front slide members 282 are mounted, is covered differently from the back wheel disc 23 carrying the back slide members, reference will first be had to Figs. 1 and 7. The front ring plate 42 in its flange section outside of the gear teeth 45 is radially slotted at spaced intervals as at 283 for each slide head member 282. On both sides of the slot, the front of the plate is projected outwardly as ribs 284 which form guides for the side edges of the slide member. Inside of the gear diameter these ribs are bridged over to hold the slide member against displacement.

The back wheel disc 23 is covered on its rear face with a ring plate 285 (Figs. 7, 21 and 22) which holds all of the back slide members in operative position on the wheel disc. Plate 285 is also slotted at spaced intervals as at 286 for each slide member 282. Spaced inwardly from its periphery, the plate is formed with rearwardly projected rib sections 287 which are joined in a solid section over each slide 282 to prevent its displacement.

When a can end is being fed into position between the separated tester head parts 241, 252 the corresponding slide 282 of the head is in its innermost position (Fig. 23). A spring ball 291 provides a detent for holding the slide in this inner as well as its outer position. Such a ball rests in one of two countersinks 292 formed in the outer face of the slide member 282. The ball is engaged by a spring 293 which is seated within a screw cap 294 threadedly engaged in the plate 285 for the tester heads in the rear and a similar construction is provided for the front tester heads. In the latter case the screw caps are threadedly held in the ring plate 42 (see Figs. 1 and 7).

When the slide 282 moves outwardly the link 279 is brought into axial alignment with the axis of the tester head. This performs the clamping of the can end in the tester head. This movement of the slide is effected by cam action and for this purpose each slide 282 carries a pin 295 on which a roller 296 is rotatably mounted. A cam segment 297 is mounted on the inside of the front housing 39 (Fig. 7) for operating the front slide members and a similar cam segment (see also Fig. 12) is mounted on the inside of the rear frame 34 for the rear slides.

The two cam segments 297 extend above and below the place where a can end is fed into a tester head. Cam 297 is provided with a cam groove 298 (Fig. 12) which is flared as at 299 so that as a tester head approaches the cam the roller 296 of that head moves up into the flared entrance of the cam groove. As it traverses the cam track, the cam wall acting on the roller pushes the slide 282 inwardly and this draws out on the movable head member 241 and opens up the head for the reception of its can end. The same action frees a can end already tested. The cam track now holds the head open until the can end has been received and centered when the slide is again moved, this time to clamp the can end within its head.

The can end clamped in its tester head is now subjected to the testing operation by manipulation of the desired testing pressures applied to its sealed testing chambers K and KK. The cam roller 296 leaves the cam track 298 at the top as the tester head passes up and beyond the cam segment 297 as the test proceeds.

Before a thorough understanding of the testing operation can be had it will be necessary to consider the mechanical construction of the pressure valve L with its connections and also the mechanical parts of the two diaphragm units M. The valve as well as the diaphragm units are mounted at the front of the machine, a part of the valve being rotatable with the wheel shaft 31 while the diaphragm units are mounted in a stationary position on the front frame.

A rotatable valve cylinder 305 (Figs. 7 and 24) is mounted upon a sleeve extension 306 formed in the front disc 22. This sleeve extension projects forward of the wheel hub 21 and the valve part 305 is secured to the disc and the extension, this part therefore turning with the wheel shaft 31. The front face of the cylinder rotates against the rear face of a non-rotatable valve ring 307 in an air tight joint.

Valve ring 307 thus encircles the sleeve extension 306 but does not touch it, as clearly shown in Figs. 24 and 25. The air tight joint is maintained by spring pressed buttons 308 which are slidably mounted in bores 309 cut in the face of the bearing 36 in the bearing block 37. These bores are spaced at equal intervals around the shaft 31 so that the valve ring is pressed evenly against the valve cylinder. Springs 310 located in the bores back up the buttons, see Figs. 7 and 31.

The valve ring 307 has a slight rubbing movement relative to the rotating valve cylinder 305 so that the contacting faces of the two members give a polishing effect to the surfaces thus preventing localized wearing. This rubbing movement is irregular and is brought about by two non-synchronized eccentrics which move the valve ring differently from above and below.

Valve ring 307 is radially slotted in the non-contacting face of the valve parts as at 315 (Figs. 24 and 25) and a sliding block 316 is mounted for slight radial movement in the slot. This part of the valve ring is above the shaft 31 and an eccentric pin 317 rotatably fits within a bore 318 cut through the block. Pin 317 is an integral part of a shaft 319 which is rotatably mounted in the upper part of the bearing 36 and which extends above and parallel to the shaft 31.

An opening 321 is also sunk in the front face of the valve ring 307, this being located below the shaft 31. Such an opening provides a rotatable fit for a second eccentric pin 322 which is an integral part of a shaft 323 which is rotatably mounted in the lower part of bearing block 36 and which is below and parallel to the shaft 31.

The two shafts 319, 323 are rotated from the shaft 31 but at different speeds so that the minute shifting of the valve ring 307 through the eccentric pin 322 is not synchronized with the movement imparted to the upper part of the valve ring by the eccentric pin 317 and its sliding block 316. A gear 325 is secured to the front end of the wheel shaft 31 and meshes with a gear 326 on shaft 319 and with a larger gear 327 on shaft 323 to effect this shifting movement.

Both of the valve members 305 and 307 are honeycombed with air ports and passageways, the valve cylinder 305 having a plurality of ports arranged in three rows on its periphery and the valve ring having but three peripheral ports. All peripheral ports in both members join with passageways leading into the valve bodies and these passageways terminate at the two contact faces of the members. Accordingly, during one complete revolution of the wheel A all of the passageways of the movable part 305 are brought at one time or another into communication with one or more of the passageways in the valve ring 307.

The individual tester head chambers K and KK are connected to the valve member 305. The peripheral ports in the inner row (i. e., toward the inside of the wheel structure A) are connected to the chambers K of the tester heads B. These ports, designated by the numeral 330 (Fig. 24) are joined with the inner ends of flexible tubes 331 (see also Fig. 7) which lead at the opposite ends into the stems 242 of the movable head members 241. The interior of the head end of each tube 331 opens into a bore 332 (Fig. 21) cut into the head stem and this bore is in communication with its associated testing chamber K. Alternate tubes 331 lead to the rear tester heads while the intervening tubes lead to the tester heads at the front of the machine.

The peripheral ports in the middle and outer rows of the valve cylinder 305 must be considered together. Every other port in the middle row and every other port in the outer row are connected to the chambers KK of the tester heads B. Therefore half of the ports in both rows are not connected to the heads but are at all times open to atmosphere.

The ports which are connected to the tester head chambers KK are designated by the numeral 335 (Figs. 7, 24 and 30). Each port 335 is connected with the inner end of a flexible tube 336 the outer end of which is connected to the fixed head member 252 of a tester head B. The interior of the head end of each tube 336 (Fig. 21) is in direct communication with its associated tester chamber KK. The tubes 336 leading from ports in the middle row of ports on the valve member 305 pass to the tester heads at the rear and those from the outer row are connected to the front tester heads.

The other ports in the valve member, that is, those alongside of the ports 335 are open to atmosphere. Such ports will be designated by the numeral 338 (Figs. 7, 24 and 30) and half of the ports will be in the middle row of ports and half in the outer row thus alternating both with each other and with ports 335.

The passageways formed in the valve member 305 and which connect with the valve ports 330, 335 and 338 will now be considered and it will be recalled that these passageways all terminate in the outer, sliding contact face of the valve member. Each port 330 (Figs. 24 and 27) joins a passageway 341. All of these passageways are equally spaced around the axis of the tester wheel A being parallel with the shaft 31 on which the wheel structure is mounted. All terminate in an inner circle in the contact face of the valve member 305, as best shown in Fig. 26.

The ports 335 which are in the middle row (which serve the rear tester heads B) join with passageways 342 which are parallel to the other passageways 341. These passageways 342 terminate in a middle circle of openings in the contact face of the valve member 305. The outer row of ports 335 (which serve the front tester heads) also join with other passageways 342. These terminate in an outer circle of openings in the contact face of the valve member. In both of the middle and outer circles of the openings only every alternate terminal opening is the end of a passageway 342 and both sets of these passageways are also staggered as to the two circles, as clearly shown in Fig. 26.

The atmosphere ports 338 both in the middle and in the outer peripheral rows of ports in the valve member 305 join with passageways 343 which terminate respectively in the middle and in the outer circles of the contact face of the valve member. Naturally such terminal ends stagger and alternate with the terminal ends of the passageways 342.

The ports and passageway in the valve ring 307 are used for delivery of compressed air into the apparatus and for air connections with the two diaphragm units M. The mechanical details of the diaphragm units will first be considered.

The front housing 39 of the machine (Figs. 1 and 7) provides a flat surface on which the two diaphragm units M are mounted, one on each side of the bearing block 37. Each diaphragm unit comprises a lower disc frame 351 (Fig. 32) which rests on the front housing and an upper disc frame 352. The two disc members are joined together and clamp the outer edge of a circular diaphragm 353. The diaphragm is of flexible material and is formed to assume a normal concentric ridged shape as indicated at 354 (see also Fig. 33).

The upper surface of the disc 351 inside of the supporting shouldered rim which engages and holds the diaphragm is formed with a series of concentric ridges and valleys 355 to correspond generally to the shape of the diaphragm. This ridged surface of the frame disc 351 is spaced below the lower surface of the diaphragm 353 when the latter is in its normal position. Such a space constitutes a testing chamber 356 below the diaphragm. Chamber 356 is in communication with three radially disposed slots 357 which are cut in the undulating surface of the disc.

The upper frame disc 352 inside of its outer diaphragm engaging rim is likewise provided with an undulating surface 358 on its under side which corresponds in general shape to the normal shape of the diaphragm 353. This lower surface of the upper disc is also spaced above the diaphragm when the latter is in its normal position and this provides a testing chamber 359 on the upper side of the diaphragm. The diaphragm provides a yielding imperforate partition between the chambers.

The chamber 359 is in communication with a row of vertically disposed holes 361 which terminate at the top in a radial slot 362 formed in the frame disc 352. There are three slots, their outer ends being open. This insures that the upper surface of the diaphragm is at all times under atmospheric pressure since the chamber 358 by reason of the openings 361 and slots 362 is open to atmosphere.

The upper disc 352 is formed with a threaded opening 365 at its center and a threaded sleeve 366 is held in this opening. A locknut 367 is also threadedly secured on the sleeve 366 and screws down against the disc. This allows for locking the sleeve in a predetermined vertical position within the disc frame 352. The sleeve 366 provides a protecting wall for a movable electrical contact member carried by the diaphragm 353.

The diaphragm 353 at its center carries a pair of washers 368, one being secured to the upper surface and the other to the lower surface of the diaphragm. The upper washer 368 is formed with a threaded hub 369 in which a pin 371 is held. The pin 371 at its upper end carries an insulation head which strikes against an electrical contact head 372 which is confined in the forward end of a hinge bar 373. The end of the bar 373 opposite the contact head is hingedly mounted on a pin 374 (see also Fig. 34).

Pin 374 is carried in an insulating block 375.

Such a block is located in a housing 376 (see also Fig. 33) which is preferably an integral part of and which extends up from the disc frame 352 being at one side of the center of the disc frame. Intermediate the hinge pin 374 and the contact head 372, the hinge bar 373 is engaged from above by a spring 381 which is mounted in the insulating block 375. This spring normally holds the bar 373 in lowered position so that its contact head 372 is out of contact with an upper contact head 382.

The upper contact head is carried in a hollow threaded bolt 383 which is threadedly secured to a forward extension 384 of the housing 376. The bolt 383 is maintained in its threaded seat by a clamp bolt 385 which passes through the slotted end of the extension 384. The contact pin 382 is formed with a slot 387 through which passes a holding pin 388. Pin 388 is carried in the hollow bolt 383.

This pin and slot connection permits slight vertical movement of the upper contact head 382, a spring 389 located in the hollow bolt, pressing down against the top of the contact pin and holding it normally in its lowered position the pin 383 forming a stop for this position. Figure 32 shows this normal position and also shows the normal position of the lower contact head 372 of the spring 381.

An air connection is made with the lower chamber 356 of each diaphragm unit M and this chamber is also provided with a cam operated rotary valve. These features will be considered at this time.

The lower disc frame 351 of the diaphragm unit is formed with a central opening 395. A valve block 396 of the cam operated rotary valve is secured to the disc on the inside and extends across this opening. Valve block 396 is formed with a depending hollow stem 397 which projects below the disc 351, this stem passing through the opening 395 therein.

The lower end of stem 397 is connected to a flexible tube 398 which passes down in front of the front housing 39 (Fig. 1) and through an opening 399 cut in the housing. The lower end of the flexible tube connects with the periphery of the valve ring 307 (see Fig. 25).

There will be two of these flexible tubes 398, one extending from each of the diaphragm units M. These two tubes are connected with the valve ring 307 at the lower part of the ring and the two connections are alongside of each other.

One tube 398 communicates with the outer end of a radially disposed port 401 (see also Fig. 29) which joins to a passageway 402. The inner terminal of passageway 402 is in the contact face of the valve ring 307. It is spaced from the center of the axis of rotation of the testing wheel unit a distance which locates it in the region of the middle circle of openings formed in the contact face of the adjoining valve member 305. It will be recalled that these openings are the terminal ends of passageways 342 and 343. The passageway 402 also communicates with an arci-form slot 403 (Fig. 25) which is cut in the contact face of the ring valve 307. The slot 403 extends radially to a point adjacent to and alongside of the connection made by the other tube 398 with the valve ring 307.

The other flexible tube 398 extending from the second diaphragm unit M communicates with a port 405 (Figs. 25 and 30). Port 405 joins with a passageway 406 which terminates in the contact face of the ring valve 307. This termination is spaced from the center of the axis of rotation of the testing wheel unit a distance which corresponds to the outer row of openings in the contact face of the adjoining valve member 305. These openings it will be recalled are the terminal ends of passageways 342 and 343. The passageway 406 also joins with an arci-form slot 407 (Fig. 25) cut in the contact face of the ring valve 307. Such a slot extends radially to a position adjacent to and alongside of the port 401 of the other diaphragm unit connection.

The lower end of the stem 397 (Fig. 32) of each diaphragm unit M is threaded and carries locknuts 415 which provide a seat for the lower end of a spring 416 which is mounted on the stem. The upper end of spring 416 engages a valve bushing 417 which is rotatably mounted on the sleeve. This bushing is another part of the cam operated rotary valve previously mentioned.

The valve bushing 417 at the top is formed with a flange 418. The flange is perforated as at 419 and the block 396 is similarly perforated at 421. The spring 416 yieldably holds these perforated surfaces together in an air-tight valve connection. When the valve bushing 417 is in the position shown in Fig. 32 its perforations 419 align with the openings 421 in the block 396. Testing chamber 356 at such a time is open to atmosphere. When the valve is closed, which takes place near the end of the testing cycle, then the proper communication is had between the test chamber 356 of the diaphragm unit and the test chamber KK of the testing head B in which the can end is being tested.

The opening and closing of the rotary valve member of each diaphragm unit M is done in time with the other operations of the machine. As previously suggested, this actuation of the valve is under cam control. Each bushing 417 is formed with a forwardly extending arm 425 (Figs. 1 and 9), the outer end of which is pivotally connected to a bifurcated block 426 secured to one end of a link 427. This link is pivotally connected to the bottom end of a long arm 428 of a bell crank lever which is pivoted on a pin 429 (Fig. 24) carried in a lug 431 which is an integral part of a bracket extension 432 of the bearing 36 and plate 37.

The bell crank lever also is formed with a short arm 433 which rotatably carries a cam roller 434. There are two bell crank levers and connecting parts, one for each of the diaphragm units M. The cam rollers 434 of the two bell crank levers are adapted to operate in the groove of a single face cam 435.

Cam 435 (Figs. 1 and 24) is mounted on the forward end of a horizontal shaft 436 which is journaled in a bearing 437 formed in the bracket extension 432. This shaft 436 also carries a gear 438 which meshes with and is driven by a gear 439 mounted on the shaft 319 adjacent to and in front of the gear 326. The groove of the cam 435 is of such contour as to operate first one and then the other of the bell crank levers at the proper time, such operation taking place at the end of a test period for each can in its testing head B.

It is at the end of the test period that the valve bushing 417 is moved to close the testing chamber 356 of the diaphragm unit M which is associated with the particular testing head functioning at the time. In the event that the can end has not leaked during a holding period, the diaphragm 353 (see also Fig. 32) of the unit will remain in its normal position and the contact heads 371, 382 will remain separated.

In the event, however, that a can end leaks, sufficient leakage air is introduced into the closed chamber 356 of the diaphragm to flex the diaphragm and close the contacts. This closing of the contacts sets up certain electrical circuits which are associated with the discharge of the can ends from the machine. Before considering this feature, however, a detailed recital of the steps in the testing of a can end in its testing head will be had.

The testing proper begins immediately following the clamping of a can end in its tester head B at which time, it will be recalled, the two testing chambers K and KK are closed off on opposite sides of the can end. Air under compression is conveyed from a suitable source of supply through an air supply pipe or tube 451 (Figs. 7 and 25). This air enters a radially disposed port 452, which extends in the valve ring 307, such a port being spaced from the axis of the tester wheel a dimension corresponding with the inner circle of the passageway openings 341 (see also Fig. 26) of the corresponding valve member 305.

Accordingly the particular tester head B which contains the can end about to be tested, receives air from the port 452 by way of a passageway 453 (Figs. 25 and 27) which joins the port 452 and which terminates in the contact face of the tester ring 307. The outer end of this passageway 453 connects with a short slot 454 cut in the contact face of the valve ring, this extending the time a passing passageway 341 in the valve member 305 is in communication with the air supply.

At this time, therefore, the passageway 341 of the valve member 305 moves across and communicates with the slot 454 and air thereupon enters through the passageway 341 through the connecting port 330 and the flexible tube 331 to the tester head B (Fig. 21). It further passes through the bore 332 formed in the movable head member 241 and on into the testing chamber K. This connection between the valve members 305 and 307 is illustrated in Fig. 27.

It will be observed also that at such a time the testing chamber KK in the fixed head member 252 of the testing head is open to atmosphere by way of the flexible tube 336, port 335 (Fig. 27) and passageway 342. The contact face of the member 305 and the terminal end of the passageway 342 at such a time is in communication with an arci-form slot 455 (see also Fig. 25) which is cut in the contact face of the member 307. At the time this passageway 342 is moving by the slot 455, one of the ports 338 and its connecting passageway 343 is also in communication with the slot. The chamber air therefore is at atmospheric pressure.

The effect of this valve seating upon the tester head under consideration is that the chamber K is filled with air under compression and the chamber KK is open to atmosphere. The tester wheel structure A continues its rotation and this condition is soon changed as the valve member 305 moves adjacent the other valve member 307. Accordingly, this described condition of chambers head air settings is immediately followed by a condition illustrated in Fig. 28.

At this time the end of the passageway 341 has moved beyond the end of the slot 454 and the compressed air is therefore shut off from further communication with the chamber K. In fact, this chamber now is locked with the predetermined pressure of compressed air in the chamber. The slot 455, however, is still in communication with the end of the passageway 343 and the testing chamber KK remains exposed to atmosphere.

This condition quickly changes for the passageway 343 soon moves beyond the slot 455 which leads to atmosphere. Thereupon both chambers K and KK are blocked off, one with air under pressure and the other at atmospheric pressure. This is the setting shown on both sides of the wheel shaft 31 in Fig. 24.

This continues throughout the greater part of the rotation of the tester head structure and may be designated the holding or actual testing phase of the testing cycle. This is the time in which air from the high pressure chamber K will leak into the low pressure chamber KK if the can end is imperfect. In other words, if there is a perforation or other break in the can end wall, the chamber KK which is also blocked under its initial atmospheric pressure will receive additional compressed air depending in amount upon the size of the opening through which the air escapes from the chamber K.

With chamber K still locked and after an appreciable time has been given for leakage of air in the event of an imperfect can end the passageway 342, associated with the port 335 and with the flexible tube 336 communicating with the chamber KK, moves in alignment with the passageway 402 formed in the valve ring 307. This condition is illustrated in Fig. 29. In the event that the pressure chamber KK has been raised above atmospheric pressure by leakage of air from the chamber K this air now passes from the passageway 402 and port 401 by way of tube 398 into chamber 356 (Fig. 32) of the associated detector unit M.

It will be understood that at this time the rotary valve bushing 417 has closed the chamber and this additional air pressure therefore pressing against the under side of the diaphragm 353 of the detector unit, closes the contact members 372, 382 and establishes an electric circuit. In the event that the can end being tested does not leak this setting of the valve parts and the connecting of the tester head chamber KK with the detector unit chamber 356 results in no pressure changes in the detector chamber and therefore the diaphragm of the detector unit remains in its normal position.

Figure 30 illustrates the same testing step for the other detector unit M. It will be observed that the same communication between the tester head chamber KK and the detector unit chamber 356 is had, the other tube 398 at that time being used and air passing, therefore, through port 405 and passageway 406 in the valve ring 307 instead of by way of the port 401 and passageway 402 when the original detector unit is in use.

This completes the testing of a can end. The can end just tested, however, must be moved further, as the tester wheel structure A continues its rotation, until the can end is in proper position for discharge. This is the reason for the delay timing unit O previously mentioned and it is this timing unit which is directly associated with the electrical circuit utilized by the contact head parts 372, 382 of the detector unit M.

The delay timing unit O after its time interval, is instrumental in determining what kind of discharge treatment a tested can end receives so before considering this delay timing unit a detailed consideration will be had of the can end throw-out device P.

The throw-out device P is located just below the position where the can end is introduced into the seaming head. There are two of these units, one for each set of tester heads. The movable head member 241 (Fig. 21) is unclamped from the fixed head member 252 by sliding of the locking slide 282 under actuation of the cam groove 298 (Figs. 12 and 23) of the segment cam 297 operating directly on the cam roller 296. It is at this time that the cam roller enters into the flared bottom 299 of the cam.

When the tested can end is released it falls into an arm of a two-arm starwheel 461 (Fig. 19) which is mounted upon the horizontal shaft 165 (see also Fig. 13). It will be observed that there are two of these discharge starwheels, one on each side of the machine. The can end is lifted by the arm 461 and is moved in a clockwise direction (Fig. 19) the can end passing at that time under an arci-form edge 462 of the guide plate 271.

As the can end traverses this circular path of travel it continues in the same vertical plane, being held against lateral displacement by a circular guide plate 463 (Figs. 10 and 19) which at its top is secured to the guide plate 271. The plate 463 is located on the outer face of the end. Adjacent the inner face of the end, a circular guide plate 464 (see also Fig. 3) is used to prevent lateral displacement in that direction. The guide 464 is secured at the top to the guide plate 271 in the same manner as in the connection with the plate 463.

At the bottom these side guide plates 463 and 464 at each side of the machine are connected with side walls 465, 466 of a discharge chute 467 (Figs. 1, 3 and 19). Chute 467 is mounted on a bracket 468 and on a bracket 469 both carried on the base 35. In the event that the end being tested is a good end and does not leak, such an end is discharged into the discharge chute 467 through which it rolls out of the machine.

The travel of a good end as just described takes place along a circular floor member 475 (see also Fig. 35) consisting of a segment which extends in a vertical plane from a point just below the termination of the edge 462 of the plate 271 to the upper end of the chute 467. This segment floor member is a movable part of the mechanism actuated in the event of an electric circuit being set up in the detector unit M when the can leaks and which is controlled as to time of movement by the time delay mechanism O.

This segment track 475 is located in the path of the can end being discharged and is between the side guides 463, 464 if the end has tested good. As long as it is in this position the can ends will continue in their circular path of travel and will be discharged by way of the can chute 467. However, the segment track may be moved to one side so that it is no longer between the guide plates 463, 464. A discharging can end is then treated in a different manner.

The operation of the time delay device O is such that when a leaky can end (marked aa) reaches the position just above the shaft 165 as in Fig. 19, the segment track 475 is shifted out of the plane of the passing can end. This leaves a discharge opening 478 between the side guides which in vertical dimension extends from the guide plate 271 to the bracket 468. Accordingly the leaky end aa instead of continuing on in its circular path of travel is thrown off in a tangent line owing to centrifugal force and drops into a bad end discharge box 479 (Figs. 3, 11 and 19). Such a box is removable and is inserted into the box frame 58 from one side being slid over the base 35 on which it rests.

The segment track 475 is secured by screws to a bracket plate 481 (Figs. 19 and 35) which is formed at one end of a bracket web 482 this web at its opposite end extending through a rear wall of and into a slide box 483 (see also Figs. 1 and 36). There are two of these slide boxes being mounted on the box frame 58. Each slide box contains the timing mechanism of the delay device O for its set of tester heads B.

Inside of the box 483 the bracket web 482 terminates in a track slide 484 (see also 36) and its position determines whether the segment track 475 is a part of the track for delivery of a good can end or is out of the path of travel of a leaky can end. Three auxiliary slide blocks are used in the delay device O for actuating the track slide 484 and for restoring it into position following its actuation. Each slide block is adapted to be moved at certain times and the proper time interval and such block movement is made effective upon the track slide by certain latch devices contained in the box 483. This connection between track slide and auxiliary block movements also depends on whether or not an electric circuit has been set up in the detector unit M.

The track slide 484 (Figs. 35 and 36) is located in a slide seat 485 formed in a side wall of the box and toward the top. At the bottom the box wall is formed with a slide seat 486 in which is located the first of the slide blocks, designated 491. This block is held for sliding movement by gibs 492 secured to the wall of the box.

The track slide 484 is formed with a transverse rib 493. The second and third slide blocks are mounted to slide on the track slide and this rib therefore provides a partition for a second slide block 494 and a third slide block 495.

A headed screw 496 is threadedly secured in the slide block 494 and an unthreaded end extends into an elongated slot 497 formed in the track slide 484. The slide block 495 also carries a headed screw 498 an unthreaded end of which extends into an elongated slot 499 also formed in the track slide. The three slide members 484, 494 and 495 are retained in their independent and in their associated slide positions by one of the gibs 492 and by two other gibs 500 mounted on a wall of the box.

The normal position for the auxiliary slide blocks 491, 494 and 495 is inwardly toward the discharging can path which is toward the left as viewed in Fig. 35. Spring barrels 501 enclosing springs are slidably mounted in spring bores which are cut into one end of each slide. These spring barrels bear against a plate 502 mounted at the front of the box 483 and yieldingly hold the slide blocks in their normal positions, i. e., toward the left in Fig. 35.

The track slide 484 also carries a pair of spring barrels 503 (Fig. 35) which bear against the box plate 502. These spring barrels enclose suitable springs and the effect of this spring action is to hold the track slide in its normal position which also is toward the left. The segment track 475 secured to the track slide is then in the can end path and accordingly good can ends are being discharged into the chute 467.

A positively movable element extends into each slide block and movement of each element takes place once in a given cycle of operation for one can end and the movement is timed within the cycle so that the actuation of the track slide 484 and of the segment track when it does take place will be properly delayed from the time a leaky can end is detected in the detector unit M. Whether a slide block is moved at the time its positively movable element makes its travel depends upon the associated latch devices.

The actuation of such positively movable elements will first be considered. The slide block 491 is slotted as at 505 (Figs. 35 and 36) and a slide bar 506 is mounted in the slot. Bar 506 is pivotally connected by a link 507 to one end of a horizontally disposed lever 508. This lever extends into the box 483 for this connection and is pivoted on a vertical shaft 511 (Fig. 1) which is carried in bracket arms 512 which extend out from the box frame 58.

The opposite end of the lever 508 carries a cam roller 513 (Fig. 6) which operates in a cam track formed in a lower cam 514. Cam 514 is secured to a vertical shaft 515 journaled in bearings 516 formed in brackets 517 carried by the front frame 40 (see also Fig. 1). Shaft 515 is continuously rotated from the shaft 165 and for this purpose carries at its top end a bevel pinion 518 which meshes with the double gear 166. This is the driving mechanism for the sliding bar 506.

In like manner the second slide block 494 (Figs. 35 and 36) is slotted as at 521 for reception of a slide bar 522. Bar 522 is pivotally connected by means of a link 523 to one end of a horizontally disposed lever 524. This lever extends into the box 483 for such a connection and is pivoted on the same vertical shaft 511 (Fig. 1). The opposite end of lever 524 carries a cam roller 525 (see also Fig. 6) which is operated on by a cam track formed in the bottom face of a double cam 526 also mounted on the shaft 515. Thus we have the positive drive for bar 522.

The slide block 495 (Figs. 35 and 36) is slotted at 531 and provides a slideway for a slide bar 532. Bar 532 is pivotally connected by a link 533 to one end of a horizontally disposed lever 534. Lever 534 extends into the box 483 for this connection and likewise is pivoted on the vertical shaft 511 (Fig. 1) just above lever 524. The opposite end of lever 534 carries a cam roller 535 (see also Fig. 6) which is operated by a cam track formed in the top face of the double cam 526.

From the foregoing it becomes evident why the several movable elements 506, 522 and 532 each having their own cam control, move in and out in definite time relation to each other and to the progress of the can end through the machine. When the time delay mechanism is set in motion by action of the diaphragm in the detector unit M an electric circuit is established which affects the first latch device for connecting the first slide block 491 with its moving slide bar 506 so that the slide block will move with the bar.

An electro-magnet 541 (Figs. 1, 36 and 37) is mounted on the bracket 517 and a core 542 provides for magnetic attraction of a sliding pin 543 housed in a boss 544 which is carried on the slide block 491. The end of the pin 543 which is inside of the boss is formed with a foot 545 and a spring 546 interposed between the boss and foot and surrounding the pin 543 tends to move the pin away from the magnet.

The foot 545 of the pin extends down into the slot 505 formed in the slide block 491 and the outer face of the foot is formed with a ledge 547 which is brought into the path of the slide bar 506 when the spring 546 holds the pin outwardly. The bar 506 is formed with a ledge 548 which under such conditions interengages with the ledge 547 (Fig. 37). When this occurs the slide block 491 moves with the bar 506 toward the right (Fig. 35) thereby compressing the spring in its spring barrel 501 and setting in motion the first of the time delay steps.

Normally the electro-magnet 541 is energized so that the foot 545 of the pin 543 is held out of engaging position with the bar 506 when it moves. The wiring connection of Fig. 14 may now be examined and it will be ascertained how the electro-magnet is operated. Two identical circuits are disclosed one for each detector diaphragm unit M and time delay unit O.

The electro-magnet 541 in each circuit is connected by a wire 550 to the lead wire 121 and by a wire 551 to lead wire 122. A switch contact 552 which is normally closed is interposed in the wire 551. As long as this switch remains closed the electro-magnet 541 is energized and the slide bar 506 moves on its regular cycle without affecting the slide block 491. The switch contact 552 is opened and closed by a solenoid 553 the coil winding of which is in the circuit which is established when the contact parts 372, 382 of the diaphragm unit M are brought together.

A wire 555 is connected to the lead wire 122 and to one end of the coil windings of the solenoid 553. The other end of the coil winding is connected to the contact head 382 of the diaphragm unit by a wire 556 (see Figs. 32 and 33). It will be observed that the hinge bar 373 and the pin 374 help complete this connection. The contact head 372 is connected by a wire 557 to the lead wire 121, a resistance such as a lamp 558 being interposed preferably in this connection. As soon as this solenoid circuit is closed at the contacts 372, 382 in the diaphragm unit M as when a leaky can end so operates the diaphragm of the unit, the energized solenoid 553 thereupon opens up the switch 552 and breaks the circuit through the electro-magnet. Thereupon the spring 546 (Fig. 36) presses the pin 543 outwardly and the first step in the timing delay unit O takes place as the slide block 491 now moves in the box 483.

This initial movement of the first of the slide blocks operates the first of the latch elements. The second slide block 494 is recessed in its lower section as at 561 and houses a latch member 562 which is pivoted on a pin 563 carried in the slide block. This latch has its free end notched at 564. Normally the latch is in the position shown in Fig. 35 at which time its notched end is below the end of the slide bar 522.

The latch member 562 is yieldably held in its normal position by a spring barrel 565 which presses down from above and holds a roller 566, carried by the latch, seated in a pocket 567 formed in the top edge of a striking finger 568. Finger 568 is carried in a recess which extends down from the top surface of the slide block 491, the finger being anchored by a pin 569 carried in the block. A recess 570 cut in the box wall between the slide blocks 491, 494 allows for clearance of the striking finger 568 in both positions of the slide 491.

When the slide block 491 moves toward the right (Fig. 35) under the sliding movement of the slide bar 506, the striking finger 568 carried thereby wedges the latch roller 566 out of its seat 567 and lifts the notch end 564 of the latch 562 against the action of the spring barrel 565. The notched end is then in the path of the second sliding bar 522. The parts are now set for the segment track 475 to be withdrawn from the path of the can end being discharged.

There is some pause between these various movements now being considered such pauses being a part of the time delay. When the sliding bar 522 moves to the right (Fig. 35) it strikes against and locks with the raised catch member 562 as both the sliding bar 522 and the slide block 494 move to the right. The slide block 491 can now return back to normal position since the locked latch 562 is now held up with the slide bar 522. The spring barrel 501 returns the slide block 491 when the slide bar 506 moves back.

At the time the latch member 562 is lifted by movement of the slide block 491, the screw 496 is at the right end of the slot 497 of the track slide 484, as shown in Figs. 35 and 38. The diagram of Fig. 38 shows the different relative positions of the two screws 496, 498 and the track slide slots 497, 499 and reference to this Fig. 38 as well as Fig. 35 at this time will be helpful in an understanding of these time delay parts now being discussed.

The setting shown in Fig. 38 and marked w corresponds to the relative position of the screws and slots associated with the slide blocks 494, 495 and the track slide 484 prior to actuation of the time delay devices O. It will be observed that both screws are in the right hand sides of the slots. In other words the slide blocks 494, 495 are to the left and the track slide 484 is also left, that is, with the segment track in good can discharging position. The spring barrels 501 keep the slide blocks 494 and 495 toward the left and the track slide 484 is held by its spring barrels 503.

One word of caution is given at this time. The right and left positions here given are to be considered only relatively. They will be reversed as to the delay mechanism on the other side of the machine.

By reason of the slot and screw setting just described movement of the slide block 494 as it is slid forward by the slide bar 522 also moves the track slide 484 toward the right. These two slide parts move against the yielding action of their spring barrels 501 and 503. This change of position is indicated in the setting x of Fig. 38. Since the slot 499 is also in the track slide and since the slide block 495 did not move, being held by its spring barrel 501, the screw 498 is now at the left of slot 499. However, since both screw block 494 and track slide 484 moved screw 496 is still at the right side of the slot 497.

This movement of the track slide has now shifted the segment track 475 out of the path of the can end being discharged and has opened up the discharge opening 478 for the defective can end.

Movement of the slide block 494 positions a latch device of the slide block 495 for subsequent movement. Slide block 494 is recessed at the top center as at 575 (Fig. 35) for the accommodation of a strike finger 576 which is anchored in the recess by a pin 577. This strike finger also backs up the upper end of the spring for the spring barrel 565. The upper end of the strike finger 576 projects up through a clearance slot 578 cut in the transverse rib 493 of the track slide 484 where it engages the latch device of the slide block 495.

Slide block 495 is recessed at the bottom as at 581 and this recess houses a latch member 582 which is pivoted on a pin 583 carried in the slide block. This latch member 582 is notched at 584 at its free end and this end of the latch member normally is in lower position as shown in Fig. 35 with its forward notched end below the sliding bar 532.

The latch 582 is held down in its normal position by a spring barrel 585 which slides within a vertical bore cut in the slide block 495. A spring 586 located in this bore and in the spring barrel forms a yielding element for the latch member. When in this normal position a roller 587 carried by the latch member seats in a pocket 588 formed in the upper end of the strike finger 576.

When the slide block 494 moves toward the right, as has been described, it forces the roller 587 out of the seat pocket 588 and lifts the notched end 584 of the latch member into the path of movement of the slide bar 532. Following this the bar 532 moves toward the right and locks with the latch member 582 and holds it locked as the slide block 495 now moves toward the right against the action of its spring barrel 501.

This movement of the slide block 495 does not change the setting of the segment track 475 but merely prolongs the time when the track is to be returned. The reason for this is best shown in Fig. 38. The setting marked y shows that in this third slide block movement, the screw 498 carried by the newly moved slide block 495 merely moves over to the right side of the slot 499 in the track slide 484.

The slide block 494 can now be returned back into normal position. The slide block 495 by means of its screw 498 still holds the track slide 484 so that the discharge opening for the defective can end is open. The return of the slide block 494 is made by the slide bar 522 moving to the left whereupon the spring barrel 501 for the slide block 494 causes the latter to follow back with the slide bar.

The setting shown at z Fig. 38 shows that when the slide block 494 moves back it merely moves its screw 496 back to the left side of the slot 497 without moving the track slide 484. When the slide bar 532 moves back to the left, the spring barrel 501 causes the slide block 495 to follow back and the track slide 484 now being no longer held moves back into normal position under action of its spring barrels 503. The track segment is thus restored to a position for discharging good can ends into the discharge chute 468.

This completes the operation of the time delay device the slide pin and slot positions coming back into those shown at w in Fig. 38. While the operation of the time delay mechanism O at the front of the apparatus has been described it will be understood that the same movement takes place for defective can ends associated with the mechanism O at the rear of the apparatus. As long as good can ends a are passing through the machine both the diaphragm unit M and the time delay mechanism O are inoperative. Since most can ends test good, this provision minimizes the movements of the parts.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices for separating the lowermost can end from the stack of ends in said magazine, transfer devices for feeding the segregated can ends alternately in opposite directions to the two sets of tester heads so that each set of heads is uniformly supplied with ends to be tested, and testing instrumentalities for testing the can ends while in said tester heads.

2. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, a segregating device for separating the lowermost can end from the stack of ends in said magazine, transfer devices for feeding the segregated can ends alternately in opposite directions to the said tester wheels so that the said heads in both wheels are progressively supplied with ends to be tested in accordance with their relative positions in the wheels, and independent testing instrumentalities in each wheel for testing the can ends while in said tester heads of said wheel.

3. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, operating devices for moving successive heads of each wheel into alignment with said magazine so that the heads of the two wheels alternate in coming into position, segregating devices for separating the lowermost can end from the stack of ends in said magazine, transfer devices for feeding the segregated can ends alternately to opposite sides of the machine, a cage located on each side for receiving the transferred can end fed thereto, mechanism for moving each cage upon receiving its can end to bring the end in a vertical position, feeding elements for moving the vertical can end into the said aligned tester head, and testing instrumentalities for testing the can ends while in said tester heads.

4. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices for separating the lowermost can end from the stack of ends in said magazine, transfer devices including an alternating feed mechanism for alternately feeding successively segregated can ends in opposite directions first to one tester wheel and then to the other to bring the can ends into said tester heads, and testing instrumentalities for testing each can end while in its tester head.

5. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices located at said magazine for separating the lowermost can end along that side from the stack of ends in said magazine, a threaded rotary drum for lowering the high side of the segregated can end so that it is in horizontal position, transfer devices including an alternating feed mechanism for alternately feeding the horizontal cut-out can end to one side for one of the tester wheels and then for feeding the next segregated and horizontally positioned can end to the other side for the other tester wheel, said transfer devices also having means for moving the can ends into vertical position and for positioning them into said tester heads, and testing instrumentalities for testing each can end while in its tester head.

6. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices for separating the lowermost can end from the stack of ends in said magazine, transfer devices including an alternating feed mechanism for alternately feeding successively segregated can ends first to one tester wheel and then to the other to bring the can ends into said tester heads, clamping elements in each tester head for clamping the can end therein so that the can end wall provides a partition between two sealed air testing chambers, and air testing instrumentalities for imposing different air pressures in the two chambers whereby leaks in the interposed can end wall disturbs said pressure difference and indicates an imperfect can end.

7. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices for separating the lowermost can end from the stack of ends in said magazine and for bringing the separated end into horizontal position, transfer devices for alternately feeding successively segregated can ends first to one tester wheel and then to the other to bring the can ends into said tester heads, said transfer devices including a pair of hinged cages located on opposite sides of said magazine, each cage having a horizontal position and a vertical position, actuating devices for moving one of said cages into horizontal position to receive a segregated can end and at the same time moving the other cage which already has received its can end to the vertical position to align its confined end with said tester head, and testing instrumentalities for testing each can end while in its tester head.

8. In a power operated can end testing machine, the combination of a vertically disposed tester wheel, means for rotating said wheel, tester heads carried by said wheel for receiving can ends to be tested, each tester head having a fixed member and a movable member, a magazine for holding can ends in substantially vertical stacked formation, segregating devices for separating the lowermost can end from the stack of ends in said magazine, a cage for receiving said segregated can end and for moving it from horizontal into vertical position, transfer devices for feeding the segregated end into said cage while in horizontal position and for feeding it from the cage into a said tester head and between said fixed and movable members when the can end is in vertical position, clamping elements for moving said movable member to clamp said can end in said head for testing, and testing instrumentalities for testing the can end while it is clamped in said head.

9. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices for separating the lowermost can end from the stack of ends in said magazine, an electric stop device for nullifying the action of said segregated devices when the stack of ends in said magazine runs low, transfer devices for feeding the segregated can ends alternately to the two sets of tester heads so that each set of heads is uniformly supplied with ends to be tested, and air testing instrumentalities for testing the can ends with air under pressure while in said tester heads.

10. In a power operated can end testing machine, the combination of a plurality of axially spaced mechanically joined tester wheels rotatable in parallel planes, motive means for driving the tester wheel assembly continuously at a constant speed, a plurality of peripherally and symmetrically disposed tester heads carried by each wheel with the tester heads on one wheel in staggered and confronting relation to those on the other wheel, a magazine fixedly mounted in a plane intermediate the wheels for supplying can ends to the tester heads of both wheels, segregating devices for separating one side of the lowermost can end from the stack of ends in said magazine, a pair of hinged cages one on each side of said magazine for receiving the segregated can ends, an alternating feed mechanism for alternately feeding successive segregated can ends laterally from under the stack of ends in the magazine first to one hinge cage and then to the other, actuating means for hinging a said hinge cage following such lateral movement of its end, a reciprocating feed bar located on each side of the machine for transferring a can end from its cage into an associated tester head, and testing instrumentalities for testing each can end while in its tester head.

11. In a power operated can end testing machine, the combination of a tester wheel, means for rotating said wheel, tester heads carried by said wheel for receiving can ends to be tested, each of said tester heads including a fixed and movable member, a magazine for holding can ends in stacked formation, segregating devices for separating the lowermost can end from the stack of ends in said magazine, transfer devices for feeding the segregated end into a said tester head and between said fixed and movable members, clamping elements for moving said movable member of a said tester head to clamp said can end in said head so that the can end wall divides two sealed testing chambers, air testing instrumentalities for creating different air pressures in the two testing chambers whereby leaks in the interposed can end wall disturbs said pressure difference, a diaphragm unit having chambers which may be connected with the testing chambers in said tester head for influencing the diaphragm of the unit to close an electric circuit when such chamber pressure difference has been disturbed, and means operable by said electric circuit for segregating the good can ends from those that leak.

12. In a power operated can end testing machine, the combination of a tester wheel having means for rotating the same, tester heads carried by said wheel for receiving can ends to be tested, each tester head having a fixed member and a movable member, a magazine for holding can ends in stacked formation, segregating devices for separating the lowermost can end from the stack of ends in said magazine, said segregating devices including a slide member for normally supporting the stack of ends in said magazine, an electrical stop device for holding said segregating slide member in stack supporting position to prevent cutting out a can end when the stack of ends in said magazine is less than a predetermined number of can ends, transfer devices for feeding the end after it is cut out from the stack into a said tester head and between said fixed and movable members, devices located in said head for centering a can end in the head as it is received, clamping elements for moving said movable member to clamp said can end in said head for testing, testing instrumentalities for testing the can end while it is clamped in said head, and means for discharging the good can ends in one place and the leaky ends in another.

13. In a power operated can end testing machine, the combination of a plurality of tester wheels, tester heads carried by said wheels for receiving can ends to be tested, devices for feeding can ends in opposite directions into said tester heads, testing instrumentalities for testing the can end while it is in a said head, a discharge unit for removing the tested can ends from the machine, said discharge unit having different exits for the good and the leaky can ends, and a diaphragm unit connected with said tester heads for selecting the discharge exit for the can ends in accordance with the test.

14. In a power operated can end testing machine, the combination of a plurality of tester wheels, tester heads carried by said wheels for receiving can ends to be tested, devices for feeding can ends in opposite directions into said tester heads, testing instrumentalities for testing the can end while in a said head, a discharge unit for receiving a tested can end from its tester head and for discharging the good and the leaky can ends by way of different exits, a diaphragm unit connected with said tester heads for selecting the discharge exit in accordance with the test, and a time delay unit connected with the discharge unit for delaying the effect of said diaphragm selection on said discharge unit.

15. In a power operated can end testing machine, the combination of a tester wheel having means for rotating the same, tester heads carried by said wheel for receiving can ends to be tested, devices for feeding a can end into a said tester head, testing instrumentalities for testing the can end while in said head, a discharge unit for receiving a tested can end from its tester head and for discharging the good and the leaky can ends by way of different exits, a track segment disposed in said discharge unit for forming a part of the good can exit, a diaphragm unit connected with said tester heads to shift said track segment from its discharge position if a can end fails to test good, and a time delay unit connected with the discharge unit and including interlatched slide members for moving at the proper time said track segment from its discharging position when said diaphragm unit detects a leaky can end.

WILLIAM W. MAHER.